United States Patent [19]
Yoshida et al.

[11] 3,934,056
[45] Jan. 20, 1976

[54] RESIN COMPOSITIONS OF HIGH ADHESIVITY COMPRISING E/VA COPOLYMER, CHLORINATED OR CHLOROSULFONATED POLYETHYLENE, AN UNSATURATED ACID AND A PEROXY COMPOUND

[75] Inventors: Masaharu Yoshida, Yokohama; Shigenobu Ishihara, Tokyo; Tsuyoshi Takahashi; Hiroki Imakura, both of Yokohama, all of Japan

[73] Assignee: Showa Denko Kabushiki Kaisha, Tokyo, Japan

[22] Filed: Nov. 26, 1974

[21] Appl. No.: 527,428

[52] U.S. Cl. .... 260/23.5 R; 260/42.34; 260/45.7 S; 260/45.7 P; 161/204; 260/45.85; 260/45.9 R; 156/332; 260/45.75 R; 260/45.75 K; 260/45.95; 260/878 R; 260/897 C; 161/218; 161/251; 161/252; 156/333
[51] Int. Cl.² .................. C08L 23/08; C08L 23/28

[58] Field of Search............ 260/897 C, 42.34, 878, 260/23.5 R; 156/333

[56] References Cited
UNITED STATES PATENTS

| | | | |
|---|---|---|---|
| 3,626,026 | 12/1971 | Fukumura et al. | 260/897 |
| 3,639,529 | 2/1972 | Mackenzie et al. | 260/897 |
| 3,641,216 | 2/1972 | Schnebelen et al. | 260/897 |
| 3,676,391 | 7/1972 | De Ross | 260/897 |

*Primary Examiner*—Carman J. Seccuro
*Attorney, Agent, or Firm*—Kemon, Palmer & Estabrook

[57] ABSTRACT

Resin compositions of high adhesivity which comprise (A) ethylene-vinylacetate copolymer or mixture of said copolymer with polyethylene, (B) chlorinated or chlorosulfonated polyethylene, (C) unsaturated carboxylic acids maintaining solid at room temperature and (D) organic peroxides or these components blended with phenolic compounds and/or acid-acceptors.

28 Claims, No Drawings

RESIN COMPOSITIONS OF HIGH ADHESIVITY COMPRISING E/VA COPOLYMER, CHLORINATED OR CHLOROSULFONATED POLYETHYLENE, AN UNSATURATED ACID AND A PEROXY COMPOUND

This invention relates to resin compositions of high adhesivity. In recent years, hot-melt adhesives have been rapidly developed. These adhesives are roughly divided into several groups: polyethylene compounds mainly consisting of polyethylene which is blended with petroleum resin, butyl rubber and polyisobutylene; polyamide compounds mainly consisting of polyamides which are blended with epoxy resins, rosin and low molecular weight polystyrene; ethylene-vinylacetate copolymer compositions mainly consisting of ethylene-vinylacetate copolymers which are blended with paraffin wax or low molecular weight polyolefins and other wax; and compositions respectively mainly consisting of polyvinyl butyral, polyvinyl acetate, vinyl acetate copolymers, cellulose derivatives, polyesters, and polymethyl methacrylate or polyvinyl ether.

As set forth in the Japanese Patent Application Publication No. 40878/71, however, the above-listed adhesive compositions do not display prominent adhesivity to polyolefins such as polyethylene and polypropylene, though proving very adhesive to metal, wood, porcelain, general plastics and rubber-like material.

Improved hot-melt adhesives proposed to date are the compositions formed of ethylene-vinyl acetate copolymer and chlorinated or chlorosulfonated polyolefins (as set forth in the Japanese Patent Application Publications Nos. 40878/71 and 18594/70), and the compositions consisting of ethylenevinyl acetate copolymer, chlorinated or chlorosulfonated polyolefins and isocyanate adducts (as disclosed in the Japanese Patent Application Publication No. 10638/71).

However, the above-mentioned adhesives and the processes of bonding had the drawbacks that adhesion between polyolefin moldings and other articles was still insufficient, though improved to some extent; preparation of such adhesives was accompanied with high plant cost; bonding operation was carried out through complicated steps; completion of adhesion consumed much time; and application of said adhesives was limited by the shapes of adherends.

Therefore, to bond polyolefin moldings with other articles such as metals, wood, synthetic resin and glass, there have heretofore been proposed various processes such as the process of activating the surface of polyolefin moldings by subjecting the surface to ionization by γ-ray radiation, ozone oxidation or high temperature treatment (the Japanese Patent Application Publication No. 11836/63), the process of subjecting polyethylene moldings to thermal degradation and later modifying it with maleic anhydride (the Japanese Patent Application Publication No. 8728/69), the process of modifying polypropylene with maleic anhydride (the Japanese Patent Application Publication No. 10757/67), the process of modifying liquid polymers of conjugated diolefin with maleic anhydride (the Japanese Patent Application Publication No. 21109/64), the process of using a copolymer of ethylene and maleic anhydride or acrylic acid (the Japanese Patent Application Publication No. 23341/63) and the process of using a graft copolymer (the Japanese Patent Application Publication No. 27235/70).

However, these processes still raise problems, like the previously mentioned adhesives and bonding processes thereof, with respect to adhesivity, preparation of adhesive compositions, bonding operation and time required therefor and the shape of articles to which the adhesive compositions are applied.

Only a few hot melt adhesive compositions have been proposed which are considered adapted for adhesion between plasticized polyvinyl chloride or polyester resins and other articles or adhesion between the same articles of said plasticized polyvinyl chloride or polyester resins respectively. There have been disclosed, for example, the method using a solution of chlorinated or oxychlorinated polyethylene having a lower crystallinity than 1% (Japanese Patent Application Publication No. 27236/70) and the method using esters of alkane dicarboxylic acid and alkane diol mixed with diisocyanates (Japanese Patent Application Publication No. 27237/70). However, these methods, too, are accompanied with the shortcomings that the adhesive compositions obtained are found to be insufficiently adhesive to plasticized polyvinyl chloride or polyesters; preparation of said adhesive compositions calls for high plant cost; bonding operation involves complicated steps; and completion of adhesion takes much time.

The present inventors previously made various studies on the process of easily effecting firm bonding between polyolefin moldings and other articles. As the result, they found that polyolefin moldings could be very firmly bonded with other articles by mixing unsaturated carboxylic acid taking the solid form at room temperature and organic peroxide with ethylene-vinyl acetate copolymer or said copolymer blended with polyethylene, placing said mixture between the polyolefin moldings and other articles, and pressing all these superposed materials together under heat (refer to the Japanese Patent Application Disclosure No. 102139/73).

The above-mentioned process of bonding polyolefin moldings with other articles eliminates the necessity of using any separately prepared adhesive or previously activating polyolefin moldings by ionization by γ-ray radiation, corona discharge, ozone oxidation or high temperature treatment.

However, the adhesive compositions obtained by the above-mentioned process show the drawbacks that they present difficulties in being extruded, particularly when the components of said compositions are mixed long in a mixer such as an extruder; and films formed from said compositions by a T-die or inflation machine are liable to be cut or punctured, obstructing the smooth film-making operation. These events are supposed to originate with the fact that a partial cross-linking reaction takes place in the ethylene-vinyl acetate copolymer or mixture of said copolymer with polyethylene by organic peroxides present therein.

The present inventors found as the result of studies that adhesive compositions consisting of ethylene-vinyl acetate copolymer or said copolymer mixed with polyethylene, unsaturated carboxylic acids maintaining solid at room temperature, organic peroxides and phenolic compounds displayed prominent adhesivity; said adhesive compositions were saved from the occurrence of a cross-linking reaction in the ethylene-vinyl acetate copolymer or said copolymer mixed with polyethylene due to the decomposition of the peroxides; the components of said compositions were easily mixed in a molten state; and films formed of said compositions were saved from difficulties such as cutting or puncture, attaining smooth film-making. Consequently, the inventors previously submitted the Japanese Patent Application No. 119786/72.

However, the composition consisting of a mixture of ethylene-vinyl acetate copolymer or said copolymer blended with polyethylene, unsaturated carboxylic acids and organic peroxides or said mixture combined with phenolic compounds still proved unsatisfactory in that said composition indicated low adhesivity to plasticized polyvinyl chloride and polyester resins, even though said composition displayed higher adhesivity than any adhesive composition described above.

The present inventors further searched for an adhesive composition having high adhesivity particularly to plasticized polyvinyl chloride and polyester resins. As the result, the inventors have accomplished this invention by finding that an adhesive composition formed of (A) ethylene-vinyl acetate copolymer or said copolymer blended with polyethylene, (B) chlorinated or chlorosulfonated polyethylene, (C) unsaturated carboxylic acids maintaining solid at room temperature and (D) organic peroxides displays the desired prominent adhesivity not only to polyolefins such as polyethylene and polypropylene but also to plasticized polyvinyl chloride and polyester resins.

Addition according to this invention of phenolic compounds to the above-mentioned adhesive compositions prevents the occurrence of a cross-linking reaction in the ethylene-vinyl acetate copolymer or said copolymer blended with polyethylene due to decomposition of the organic peroxides, thereby facilitating the mixing of the components of the adhesive compositions in a molten state, saves films formed of the adhesive compositions from being cut or punctured to attain a smooth film-making operation and also suppresses the occurrence of a cross-linking reaction in the chlorinated or chlorosulfonated polyethylene due to the decomposition of the organic peroxides.

Moreover, addition according to this invention of acid-acceptors to the above-mentioned adhesive compositions prevents the decomposition of chlorinated or chlorosulfonated polyethylene. For the object of this invention, the phenolic compounds and acid-acceptors may be added alone or in combination.

The adhesive composition of this invention eliminates the necessity of using any other adhesive and carrying out the pretreatments of the surface of adherends, for example, ionization by γ-ray radiation, ozone oxidation or high temperature treatment in the case of adherend of polyethylene, or activating the surface of a steel plate and a sheet of plasticized polyvinyl chloride by primer treatment when the latter is bonded to the former.

The ethylene-vinyl acetate copolymer used as a component of an adhesive composition in this invention contains 1 to 40 percent by weight or preferably 5 to 35 percent by weight or most preferably 10 to 30 percent by weight of vinyl acetate. If the proportion of vinyl acetate falls to below 1 percent by weight, then there will not be obtained prominent adhesivity. Conversely, if the content of the vinyl acetate exceeds 40 percent by weight, the adhesive composition will become too soft. Particularly where said composition is molded in the form of films or sheets, then superposed films or sheets will be readily bonded each other at room temperature, undesirably deteriorating the operation of bonding. If, in case the content of vinyl acetate rises above 40 percent by weight in ethylene-vinyl acetate copolymer, the ethylene-vinyl acetate copolymer is blended with polyethylene so as to cause the proportion of the vinyl acetate to fall within the range of 1 to 40 percent by weight based on said mixture, then the resulting adhesive composition containing said mixture will present good adhesivity and not become unduly soft, so that it will be fully available for use in the subject bonding.

The chlorinated or chlorosulfonated polyethylene used in this invention is prepared by chlorinating or chlorosulfonating polyethylene in an aqueous suspension or solvent (for example, carbon tetrachloride) or a gaseous phase.

The raw polyethylene of the chlorinated or chlorosulfonated polyethylene may be a homopolymer of ethylene, or ethylene copolymers consisting of ethylene as a main component and 10% by weight at most of other components of α-olefins such as propylene or butene-1. The raw polyethylene is chosen to have a density of 0.93 to 0.98 g/cc and a molecular weight of at least 50,000, or preferably 70,000 to 300,000. If chlorinated or chlorosulfonated polyethylene prepared from polyethylene having a smaller molecular weight than 50,000 is used, then the resultant adhesive composition will not have a fully satisfactory adhesivity.

The chlorinated polyethylene used in this invention is chosen to have a degree of chlorination of preferably 20 to 50%, or most preferably 25 to 45% by weight. If said degree of chlorination decreases from 20% by weight, then the resultant adhesive composition will fail to display a sufficient adhesivity to plasticized polyvinyl chloride and polyester resins. Conversely, if the degree of chlorination exceeds 50% by weight, then the resultant adhesive composition will present difficulties in being molded into, for example, films or sheets.

The chlorosulfonated polyethylene is chosen to have a degree of chlorination of preferably 20 to 45% or most preferably 25 to 40% by weight and also have a preferably smaller degree of sulfonation than 5% by weight. The chlorinated or chlorosulfonated polyethylene is generally chosen to have a residual crystallinity (as measured by a differential thermal analyzer) of 55% at most or preferably 0.5 to 50% or most preferably 1.0 to 40%.

The unsaturated carboxylic acids used in this invention are aliphatic or aromatic unsaturated carboxylic acids remaining solid at room temperature. However, those of said unsaturated carboxylic acids which remain liquid at room temperature such as acrylic acid and methacrylic acid evolve bad odor and are strongly corrosive when mixed with the ethylene-vinyl acetate copolymer or said copolymer blended with polyethylene and the aforesaid chlorinated or chlorosulfonated polyethylene in, for example, a roll mill, Banbury mixer or extruder in common use, presenting difficulties not only in the mixing operation itself, but also in rendering the resultant mixture homogeneous. Further, where the mixture is left intact, the above-mentioned acrylic acid or methacrylic acid undesirably gest scattered and lost. Solid aliphatic unsaturated carboxylic acids usable in this invention include crotonic acid, maleic acid, fumaric acid, itaconic acid, 2-methylene glutaric acid and citraconic acid. Solid aromatic unsaturated carboxylic acids available for this invention include, for example, cinnamic acid. These unsaturated carboxylic acids may be used alone or in combination.

Further, this unsaturated carboxylic acids used in this invention are limited to that type which is little or not polymerized at all by itself. When fumaric acid, for example, is mixed with 5% by weight of dicumyl peroxide (DCP), followed by heating 7 minutes at 165°C, the resultant product is dry powder. Analysis by the intrinsic viscosity using methyl alcohol as a solvent or gel chromatography shows that said product does not contain any high molecular weight substance.

The adhesive compositions of this invention formed of ethylene-vinyl acetate copolymer or said copolymer blended with polyethylene, chlorinated or chlorosulfonated polyethylene, unsaturated carboxylic acids, and organic peroxides display very prominent adhesivity, and moreover, even when left intact, are little reduced in adhesivity. The organic peroxides used in this invention are of the type which is generally used as an initiator in radical polymerization and include dialkyl peroxide such as dicumyl peroxide; diacyl peroxide such as benzoyl peroxide; ketone peroxides such as methyl ethyl ketone peroxide and 1, 1-bis-t-butyl peroxy-3, 3, 5-trimethyl-cyclohexane; hydroperoxides such as cumene hydroperoxide and 2,5-dimethyl hexane-2, 5-dihydroperoxide; and peroxy esters such as t-butyl peroxybenzoate, t-butyl peroxyacetate and 2, 5-dimethyl-2, 5-dibenzoyl peroxyhexane. Said organic peroxides are preferred to be solids at normal temperature and particularly in the powdered form. Most preferably are those organic peroxides which have a decomposition temperature (a 10-hour half life value) above 60°C. These organic peroxides may be used alone or in combination.

The proportion of the chlorinated or chlorosulfonated polyethylene is chosen to be 1 to 100 or preferably 3 to 50 or most preferably 5 to 30 parts by weight based on 100 parts by weight of the ethylene-vinyl acetate copolymer or said copolymer blended with polyethylene. If said proportion is smaller than 1 part by weight, then the resultant adhesive composition will have low adhesivity particularly to plasticized polyvinyl chloride or polyester resins. If said proportion rises above 100 parts by weight, the resultant adhesive composition will also decrease in adhesivity particularly to polyolefins or metal articles.

For the object of this invention, the proportion of unsaturated carboxylic acid is chosen to be 0.05 to 100, preferably 0.1 to 50, or most desirably 0.5 to 10 parts by weight based on 100 parts by weight of ethylene-vinyl acetate copolymer or a mixture of said copolymer with polyethylene. If said proportion is smaller than 0.05 part by weight, then the resulting adhesivity will decrease. Conversely, if said proportion exceeds 100 parts by weight, then the bonded layer will become brittle, rather reducing adhesivity.

The proportion of organic peroxides is chosen to be 0.005 to 10.0 parts by weight or preferably 0.05 to 5.0 or most preferably 0.1 to 4.0 parts by weight based on 100 parts by weight of ethylene-vinyl acetate copolymer or a mixture of said copolymer with polyethylene. If said proportion increases over 10.0 parts by weight, then not only the resulting adhesivity will decrease and become less uniform, but also ethylene-vinyl acetate copolymer will indicate more prominent cross linking at the time of mixing or during storage, presenting difficulties in handling. Conversely, if said proportion is less than 0.005 part by weight, then addition of said organic peroxides will have a decreased effect.

While the object of this invention is attained by preparing adhesive compositions essentially from the ethylene-vinyl acetate copolymer or said copolymer blended with polyethylene, chlorinated or chlorosulfonated polyethylene, unsaturated carboxylic acids and organic peroxides, addition of phenolic compounds and/or acid-acceptors enables the adhesive compositions of this invention to display a far higher effect. As previously mentioned, addition of the phenolic compounds prevents the occurrence of a cross-linking reaction in the ethylene-vinyl acetate copolymer or said copolymer blended with polyethylene to facilitate the mixing of the components of said adhesive compositions in a molten state, saves films or sheets formed of said compositions from being cut or punctured to attain a smooth film-making operations and also suppresses the occurrence of a cross-linking reaction in the chlorinated or chlorosulfonated polethylene, enabling the components of said adhesive compositions to be easily mixed in a molten state.

Organic compounds generally used as antioxidants, particularly those used with synthetic resins or rubber-like materials such as amine compounds (for example, phenyl-$\alpha$-naphthyl amine and N, N'-di-$\beta$-naphthyl-p-phenylene-diamine), sulfide compounds (for example, dilauryl thiodipropionate) and phosphite compounds (for example, triphenyl phosphite) are indeed effective from the standpoint of preventing the occurrence of a cross-linking reaction due to decomposition of the organic peroxides. But application of these antioxidants is not preferred, because it considerably decreases the adhesivity of the adhesive compositions of this invention.

Addition of the acid-acceptors is favorable, because it suppresses the decomposition of chlorinated or chlorosulfonated polyethylene due to heat applied during the molding of the adhesive compositions or the mixing of the components thereof.

The phenolic compounds used in this invention are the monophenols, the bisphenols, the trisphenols and the tetraphenols. The monophenols particularly preferred for this invention include phenol; cresol; xylenol; 2, 6-di-tert-butyl-4-methyl phenol; 2,6-di-tert-butyl-4-ethyl phenol; 2,6-di-tert-butyl-4-methoxy phenol; n-octadecyl-$\beta$-(4'-hydroxy-3',5'-di-tert-butyl phenyl) propionate; catechol; and hydroquinone. The bisphenols include 2,2'-methylene-bis(4-methyl-6-tert-butyl-phenol); 4,4'-butylidene-bis(3-methyl-6-tert-butyl phenol); 4,4'-thiobis-(3-methyl-6-tert-butyl phenol); 2,2'-thiobis-(4-methyl-6-tert-butyl phenol); and 4,4'-isopropylidenediphenol. The trisphenols include 1,3,5-trimethyl-2,4,6-tris(3,5-di-tert-butyl-4-hydroxybenzyl) benzene and 1,1,3-tris(2-methyl-4-hydroxy-5-tert-butyl phenol) butane. The tetraphenols include tetrakis[methylene- 3-(3',5'-di-tert-butyl-4'-hydroxyphenyl) propionate] methane. These phenolic compounds may be used alone or in combination.

The proportion of the phenolic compounds is chosen to be 5.0 parts by weight at most, or preferably 0.1 to 2.0 or most preferably 0.2 to 1.0 parts by weight based on 100 parts by weight of the ethylene-vinyl acetate copolymer or said copolymer blended with polyethylene. If said proportion increases over 5.0 parts by weight, then the resultant adhesive composition will undesirably decrease in adhesivity.

The acid-acceptors used in this invention are the type which is generally applied as a stabilizer of polyvinyl chloride resins (PVC). These acid-acceptors are added to the PVC to suppress the occurrence of dehydrochlorination of the PVC with the resultant coloration and deterioration when the PVC is exposed long to heat and light. The acid-acceptors include methallic soaps such as lithium stearate, magnesium stearate, aluminium stearate, calcium stearate, calcium chlorostearate, calcium laurate, strontium stearate, barium stearate, barium chlorostearate, barium laurate, barium 2-ethylhexylate, barium ricinoleate, zinc stearate, zinc 2-ethylhexylate, zinc ricinoleate, cadmium stearate, cadmium chlorostearate, cadmium laurate, cadmium 2-ethylhexylate, cadmium ricinoleate, lead stearate, dibasic lead stearate, lead 2-ethylhexylate, tribasic lead maleate, dibasic lead phthalate, and lead salicylate; salts of inorganic acids such as cadmium alkyl allyl phosphite, coprecipitated lead orthosilicate and silica gel, basic lead silicate sulfate, tribasic lead sulfate, basic lead sulfite, and dibasic lead phosphite; organic tin compounds such as dibutyl-tin dilaurate, dibutyl-tin maleate, dibutyl-tin laurate maleate complex, dioctyl-tin compounds and stannane diol derivatives; chelating agents such as aldehyde-amine condensates and ketone-amine condensates; organic compounds containing epoxy radicals such as uncured epoxy resins; and mixtures of the above listed PVC stabilizers. While these acid-acceptors may be used alone, they are generally applied in combination.

The proportion of the acid-acceptors is chosen to be 10 parts by weight at most, or generally 0.1 to 5.0 parts by weight based on 100 parts by weight of the chlorinated or chlorosulfonated polyethylene. However, said proportion may be increased to 5.0 to 10.0 parts by weight, where the adhesive compositions of this invention are prepared or molded under rigorous conditions or the moldings of said compositions are applied under severe conditions with the resultant coloration and deterioration due to decomposition of the chlorinated or chlorosulfonated polyethylene. If, however, the proportion of the acid-acceptors exceeds 10.0 parts by weight, no increased effect will be expected.

Blended of a mixture of ethylene-vinyl acetate copolymer or said copolymer blended with polyethylene, chlorinated or chlorosulfonated polyethylene, unsaturated carboxylic acids and organic peroxides, or said mixture combined with phenolic compounds and/or acid-acceptors should preferably be effected by bringing the components to a molten state, using a mixer such as a hot roll mill, Banbury mixer or extruder. It is also possible to mix the aforesaid components using an organic solvent, or to effect said mixing by dissolving or suspending the unsaturated carboxylic acids and organic peroxides, or said carboxylic acids, said peroxides and phenolic compounds and/or acid-acceptors in water or an organic solvent and thereafter contacting the resultant solution with ethylene-vinyl acetate copolymer or said copolymer blended with polyethylene, and chlorinated or chlorosulfonated polyethylene followed by evaporation of the water or organic solvent. High mixing temperature gives rise to the drawbacks that not only the possible decomposition of organic peroxides will lead to the cross linking of ethylene-vinyl acetate copolymer and chlorinated or sulfochlorinated polyethylene to decrease the wettability of the adhesive composition to an object article, failing to provide good adhesivity, but also stirring will have to be stopped during mixing because of said cross linking. While mixing should preferably be carried out at as low a temperature as possible, said mixing temperature is desired to be a lower level than that at which the half life value of the decomposition of organic peroxides used indicates 1 hour, though a higher temperature level than that at which said half life value indicates 1 hour may be admissible as a general guide. Namely, it is required that the aforesaid components be mixed at the temperature at which the decomposition of organic peroxides does not take place and that an adhesive composition be bonded to an object article at the temperature at which said decomposition is fully effected.

The adhesive compositions of this invention which not only display prominent adhesivity to various materials, but also evolve little odor provide convenience in preparing said compositions, namely, mixing the components thereof, molding the compositions into, for example, films or sheets and also carrying out a bonding operation. The present adhesive compositions have further advantages that it is unnecessary to use any other adhesive and previously subject the surface of an adherend to ionization by γ-ray radiation, corona discharges, ozone oxidation, high temperature treatment or other chemical treatments, and that the present adhesive compositions little corrode or deteriorate an adherend.

The resin composition according to this invention displaying prominent adhesivity can attain bonding between substantially all materials regardless of the forms taken thereby. The materials admitting of bonding by the resin composition of this invention include metals such as aluminium, iron, copper, lead, chromium, zinc, tin, nickel and noble metals and alloys thereof (for example, brass, bronze, stainless steel and silver solder); synthetic resins such as polyacrylonitrile, acrylonitrile-butadiene-styrene resin (ABS resin), polystyrene, polymethyl methacrylate, acrylonitrile-styrene copolymer (AS resin), polyamide resin, phenol resin, urea resin, melamine resin and blends thereof; rubber-like materials such as polybutadiene rubber, styrene-butadiene rubber (SBR), acrylonitrile-butadiene rubber (NBR), ethylene-propylene rubber (EPR), ethylene-propylene-diene terpolymer (EPT) and polychloroprene rubber; cellulosic materials such as wood, paper and cotton; and inorganic compounds such as glass, gypsum, cement and stones.

Also, the resin composition of this invention exhibits prominent adhesivity to polyolefins such as polyethylene and polypropylene, plasticized vinyl chloride resins and polyesters resins all of which are generally known as the resins having low adhesivity.

The resin composition according to this invention displaying prominent adhesivity as previously described can attain bonding between the above-listed materials regardless of the forms taken thereby. These forms include powders, films, sheets, foils, pipes, boards, rods, balls, fibers, woven fabrics and containers.

While the adhesive compositions of this invention may be applied to shaped or powdered forms of adherends by spraying or coating the solution or suspension of said compositions on the surface of the shaped articles or powders, or immersing the adheredns in said solution or suspension, it is preferred uniformly to deposit the adhesive compositions on the surface of the adherends to an extent ranging from 0.01 mg/cm$^2$ to 1g/cm$^2$.

Where the adhesive compositions of this invention are applied to the relatively smooth surface of adherends such as films, sheets, foils, bars, pipes and fabric, then it is advised to previously mold said compositions into films or sheets without the occurrence of any cross-linking reaction and interpose said moldings between the adherends for mutual bonding thereof. Said molding operation should preferably be carried out at a lower level of temperature than that at which the half life value of the decomposition of the organic peroxides used indicates one hour from the standpoint of suppressing a cross-linking reaction, though a higher temperature level than that at which said half life value indicates 1 hour may be admissible as a general guide. Adherends can be bonded together easily and firmly by interposing films or sheets molded from the adhesive compositions of this invention therebetween, followed by hot pressing.

Adherends should preferably be bonded together at such a temperature as is higher than at which the half life value of the decomposition of organic peroxides used indicates 10 or perferably 1 hour. Obviously, there should be applied such a temperature at which articles of synthetic resins or synthetic rubbers are saved from deformation or deterioration.

Time of bonding varies with the kinds of components constituting an adhesive composition, the proportions in which they are mixed together, temperature of bonding and the force with which adherends are pressed together. Generally, however, bonding of 1 to 10 minutes will be sufficient.

As mentioned above, the adhesive compositions of this invention having ready prominent adhesivity to various shaped articles formed of particularly olefinic resins such as ethylenic resins and propylenic resins and polyvinyl chloride and polyester resins, all of which originally have low bondability can be applied in wide fields such as synthetic leather laminates made of plasticized polyvinyl chloride (soft polyvinyl chloride resins), decorative panels manufactured by coating plasticized polyvinyl chloride or polyester resins on the surface of woods or by coating said plasticized polyvinyl chloride or polyester resins on the surface of steel plates, and structural materials such as those consisting of aluminium or stainless steel plates combined with shaped articles of ethylenic resins.

This invention will be more fully understood by reference to the examples and controls which follow. Throughout the examples and controls, the bonding strength (peel strength) of samples was determined by peeling them through an angle of 180°at a tensile speed of 100 mm/min. in accordance with the method specified in ASTM D 903-49.

EXAMPLE 1

Pellets were formed by an extruder of 40 mm diameter at 90°C while kneading an adhesive composition consisting of a mixture of 100 parts by weight of ethylene-vinyl acetate copolymers containing 25% by weight of vinyl acetate (manufactured by Sumitomo Chemical Co., Ltd. under a trade name "Evatate K 2010"), 20 parts by weight of chlorinated polyethylene containing 45% by weight of chlorine (residual crystallinity of 10.8%) obtained by chlorinating polyethylene of about 200,000 molecular weight, 3 parts by weight of maleic acid, 0.3 part by weight of tert-butyl peroxy stearate, 0.2 part by weight of 2,6-di- tert-butyl-4-methyl phenol as phenolic compounds of stabilizer and 1.0 part by weight of dibutyl-tin maleate (5% by weight based on the chlorinated polyethylene) as an acid-acceptor. The pellets thus formed were molded into a sheet about 100 microns thick by a T-die extruder set at 100°C.

The sheet thus molded was placed between a 0.1 mm thick aluminium foil whose bonding surface was previously degreased by trichloroethylene and a 1 mm thick sheet of high density polyethylene (manufactured by Showa Yuka K.K. under a trade name "Sholex 6060"), followed by three minute hot pressing at a temperature of 160°C and a pressure of 10 kg/cm$^2$. The hot pressed bonded mass had a peel strength of 18.5 kg/2.5 cm width.

Hot pressing was carried out in substantially the same manner as described above, excepting that the high density polyethylene sheet used in forming a bonded mass was replaced by a 100-micron thick sheet of polyvinyl chloride resin containing 23% by weight of dioctyl phthalate as a plasticizer. The hot pressed bonded mass had a peel strength of 16.5 kg/2.5 cm width.

A sheet of an adhesive composition prepared from an ethylene-vinyl acetate copolymer and other components by the above mentioned process was disposed between a 5 mm thick wooden plate (veneer plate) and a 100-micron thick sheet of polyester (manufactured by Toray Inductries, Inc. under a trade name "Lumirror"). Hot pressing was effected in the same manner as described above. The hot pressed adhesive bonded mass had a peel strength of 15.4 kg/2.5 cm width.

CONTROL 1

An adhesive composition was prepared in substantially the same manner as in Example 1, excepting that the chlorinated polyethylene was omitted. The adhesive composition thus prepared was molded into a sheet in the same manner as in Example 1. The adhesive sheet was put between an aluminium foil and high density polyethylene sheet as in Example 1. Hot pressing was carried out in the same manner as in Example 1. The hot pressed bonded mass had a peel strength of 15.5 kg/2.5 cm width.

Hot pressing was conducted in substantially the same manner as described above, excepting that the high density polyethylene sheet used in forming a bonded mass was replaced by a polyvinyl chloride sheet. The hot pressed bonded mass had a peel strength of 1.4 kg/2.5 cm width.

Hot pressing was carried out in the same manner as in Example 1 of a sheet of adhesive composition prepared by the above-mentioned process and placed between a wooden plate and polyester sheet as in Example 1. The hot pressed bonded mass had a peel strength of 1.5 kg/2.5 cm width.

CONTROL 2

An adhesive composition was prepared in substantially the same manner as in Example 1, excepting that the maleic acid used in Example 1 was omitted, and molded into a sheet in the same manner as in Example 1. The adhesive sheet thus molded was put between an aluminium foil and high density polyethylene sheet as in Example 1. Hot pressing was conducted in the same manner as in Example 1. The hot pressed bonded mass had a peel strength of 1.7 kg/2.5 cm width.

Hot pressing was carried out in substantially the same manner as described above, excepting that the high density polyethylene sheet used in forming a bonded mass was replaced by the polyvinyl chloride sheet used in Example 1. The hot pressed bonded mass had a peel strength of 1.4 kg/2.5 cm width.

Hot pressing was conducted in the same manner as in Example 1 of a sheet of adhesive composition prepared by the above-mentioned process and placed between a wooden plate and polyester sheet as in Example 1. The bonded mass had a peel strength of 1.5 kg/2.5 cm width.

CONTROL 3

An adhesive composition was prepared in substantially the same manner as in Example 1, excepting that the tert-butyl peroxy stearate used in Example 1 was omitted, and molded into a sheet in the same manner as in Example 1.

The adhesive sheet thus prepared was placed between the aluminium foil and high density polyethylene sheet used in Example 1. Hot pressing was conducted in the same manner as in Example 1. The hot pressed bonded mass had a peel strength of 1.8 kg/2.5 cm width.

Hot pressing was carried out in substantially the same manner as described above, excepting that the high density polyethylene sheet used in forming a bonded mass was replaced by the polyvinyl chloride sheet used in Example 1. The hot pressed bonded mass had a peel strength of 1.3 kg/2.5 cm width.

Hot pressing was effected in the same manner as in Example 1 of a sheet of adhesive composition prepared by the above-mentioned process and held between a wooden plate and polyester sheet as in Example 1. The hot pressed bonded mass hadd a peel strength of 1.6 kg/2.5 cm width.

EXAMPLE 2

Pellets were formed by an extruder used in Example 1 at 140°C while kneading an adhesive composition consisting of a mixture of 100 parts by weight of an ethylene-vinyl acetate copolymer containing 26% by weight of vinyl acetate (manufactured by Toyo Soda Mfg. Co. under a trade name "Ultrathene UE-634"), 10 parts by weight of chlorinated polyethylene containing 40% by weight of chlorine (residual crystallinity of 45%) obtained by chlorinating polyethylene of about 85,000 molecular weight, 10 parts by weight of chlorinated polyethylene containing 35% by weight of chlorine (residual crystallinity of 4.8%) obtained by chlorinating polyethylene of about 120,000 molecular weight, 7 parts by weight of fumaric acid, 0.5 part by weight of dicumyl peroxide, 0.5 part by weight of 2,6-di-tert-butyl-4-methyl phenol and 0.6 part by weight of dibutyl-tin maleate (3.0% by weight based on the chlorinated polyethylene). The pellets thus formed were molded into an about 100-micron thick sheet by a T-die extruder set at 120°C.

The adhesive sheet thus prepared was held between an aluminium foil and high density polyethylene sheet as in Example 1. Hot pressing was effected in the same manner as in Example 1. The hot pressed bonded mass had a peel strength of 13.5 kg/2.5 cm width.

Hot pressing was performed in substantially the same manner as described above, excepting that the high density polyethylene sheet used in forming a bonded mass was replaced by the polyvinyl chloride sheet used in Example 1. The hot pressed bonded mass had a peel strength of 20.5 kg/2.5 cm width.

Hot pressing was effected in the same manner as in Example 1 of a sheet of adhesive composition prepared by the process described above and placed between a wooden plate and polyester sheet as in Example 1. The hot pressed bonded mass had a peel strength of 21.4 kg/2.5 cm width.

CONTROL 4

An adhesive composition was prepared in substantially the same manner as in Example 2, excepting that the chlorinated polyethylene used in Example 2 was omitted, and molded into a sheet in the same manner as in Example 2. The adhesive sheet thus prepared was held between an aluminium foil and high density polyethylene sheet as in Example 2. Hot pressing was performed in the same manner as in Example 2. The hot pressed bonded mass had a peel strength of 10.1 kg/2.5 cm width.

Hot pressing was conducted in substantially the same manner as described above, excepting that the high density polyethylene sheet used in forming a bonded mass was replaced by the polyvinyl chloride sheet used in Example 2. The hot pressed bonded mass had a peel strength of 1.3 kg/2.5 cm width.

Hot pressing was carried out in the same manner as in Example 2 of a sheet of adhesive composition prepared by the above-mentioned process and held between a wooden plate and polyester sheet as in Example 2. The hot pressed bonded mass had a peel strength of 4.4 kg/2.5 cm width.

CONTROL 5

An adhesive composition was prepared in substantially the same manner as in Example 2, excepting that the fumaric acid used in Example 2 was omitted, and molded into a sheet in the same manner as in Example 2.

The adhesive sheet thus prepared was disposed between an aluminium foil and high density polyethylene sheet as in Example 2. Hot pressing was effected in the same manner as in Example 2. The hot pressed bonded mass had a peel strength of 2.6 kg/2.5 cm width.

Hot pressing was performed in substantially the same manner as described above, excepting that the high density polyethylene sheet used in forming a bonded mass was replaced by the polyvinyl chloride sheet used in Example 2. The bonded mass had a peel strength of 1.2 kg/2.5 cm width.

Hot pressing was carried out in the same manner as in Example 2 of a sheet of adhesive composition prepared by the above-mentioned process and held between a wooden plate and polyester sheet as in Example 2. The hot pressed bonded mass had a peel strength of 2.1 kg/2.5 cm width.

CONTROL 6

An adhesive composition was prepared in substantially the same manner as in Example 2, exepting that the dicumyl peroxide used in Example 2 was omitted, and molded into a sheet in the same manner as in Example 2.

The adhesive sheet thus prepared was held between an aluminium foil and high density polyethylene as in Example 2. Hot pressing was performed in the same manner as in Example 2. The hot pressed bonded mass had a peel strength of 3.1 kg/2.5 cm width.

Hot pressing was conducted in substantially the same manner as described above, excepting that the high density polyethylene sheet used in forming a bonded mass was replaced by the polyvinyl chloride sheet used in Example 2. The hot pressed bonded mass had a peel strength of 1.1 kg/2.5 cm width.

Hot pressing was carried out in the same manner as in Example 2 of a sheet of adhesive composition prepared by the above-mentioned process and placed between a wooden plate and polyester sheet as in Example 2.

The hot pressed bonded mass had a peel strength of 3.8 kg/2.5 cm width.

EXAMPLE 3

Pellets were prepared by an extruder used in Example 1 at 140°C while kneading an adhesive composition consisting of a mixture of 100 parts by weight of ethylene-vinyl acetate copolymer containing 20% by weight of vinyl acetate (manufactured by Toyo Soda Mfg. Co. under a trade name "Ultrathene UE-631"), 15 parts by weight of chlorinated polyethylene containing 40% by weight of chlorine (residual crystallinity of 45%) obtained by chlorinating polyethylene of about 85,000 molecular weight, 10 parts by weight of fumaric acid, 0.5 part by weight of dicumyl peroxide, 0.2 part by weight of 2,6-di-tert-butyl-4-methoxyphenol and 0.3 part by weight of dibutyl-tin dilaurate (2.0% by weight based on the chlorinated polyethylene). The pellets thus formed were molded into an about 100-micron thick sheet by a T-die extruder set at 120°C.

The adhesive sheet thus molded was held between an aluminium foil and high density polyethylene sheet as in Example 1. Hot pressing was performed in the same manner as in Example 1. The hot pressed bonded mass had a peel strength of 13.5 kg/2.5 cm width.

Hot pressing was effected in substantially the same manner as described above, excepting that the high density polyethylene sheet used in forming a bonded mass was replaced by the polyvinyl chloride sheet used in Example 1. The hot pressed bonded mass had a peel strength of 20.5 kg/2.5 cm width.

Hot pressing was performed in the same manner as in Example 1 of a sheet of adhesive composition prepared by the above-mentioned process and held between a wooden plate and polyester sheet as in Example 1. The hot pressed bonded mass had a peel strength of 21.4 kg/2.5 cm width.

CONTROL 7

An adhesive composition was prepared in substantially the same manner as in Example 3, excepting that the proportion of chlorinated polyethylene used in Example 3 was changed to 0.5 part by weight (with the proportion of the dibutyl-tin dilaurate set at 2.0% by weight based on said changed proportion of the chlorinated polyethylene). The adhesive composition thus prepared was molded into a sheet, which was placed between an aluminium foil and high density polyethylene sheet as in Example 3 with hot pressing carried out in the same manner as in Example 3. The hot pressed bonded mass had a peel strength of 10.8 kg/2.5 cm width.

Hot pressing was performed in the same manner as described above, excepting that the high density polyethylene sheet used in forming a bonded mass was replaced by the polyvinyl chloride sheet used in Example 3. The hot pressed bonded mass had a peel strength of 2.1 kg/2.5 cm width.

Hot pressing was carried out in the same manner as in Example 3 of a sheet of adhesive composition prepared by the above-mentioned process and placed between a wooden plate and polyester sheet as in Example 3. The hot pressed bonded mass had a peel strength of 2.2 kg/2.5 cm width.

CONTROL 8

An adhesive composition was prepared in substantially the same manner as in Example 3, excepting that the proportion of the chlorinated polyethylene used in Example 3 was changed to 20 parts by weight and the proportion of dibutyl-tin dilaurate was altered to 4.0 parts by weight (2.0% by weight based on said changed proportion of the chlorinated polyethylene). The adhesive composition thus prepared was molded into a sheet, which was put between an aluminium foil and high density polyethylene sheet as in Example 3, with hot pressing carried out in the same manner as in Example 3. The hot pressed bonded mass had a peel strength of 3.5 kg/2.5 cm width.

Hot pressing was conducted in substantially the same manner as described above, excepting that the high density polyethylene sheet used in forming a bonded mass was replaced by the polyvinyl chloride sheet used in Example 3. The hot pressed bonded mass had a peel strength of 4.2 kg/2.5 cm width.

Hot pressing was performed in the same manner as in Example 3 of a sheet of adhesive composition prepared by the above-mentioned process and placed between a wooden plate and polyester sheet as in Example 3. The hot pressed bonded mass had a peel strength of 5.8 kg/2.5 cm width.

CONTROL 9

An adhesive composition was prepared in substantially the same manner as in Example 3, excepting that the fumaric acid used in Example 3 was omitted. The adhesive composition thus prepared was molded into a sheet, which was held between an aluminium foil and high density polyethylene sheet as in Example 3, with hot pressing conducted in the same manner as in Example 3. The hot pressed bonded mass had a peel strength of 2.5 kg/2.5 cm width.

Hot pressing was performed in substantially the same manner as described above, excepting that the high density polyethylene sheet used in forming a bonded mass was replaced by the polyvinyl chloride sheet used in Example 3. The hot pressed bonded mass had a peel strength of 3.2 kg/2.5 cm width.

Hot pressing was effected in the same manner as in Example 3 of a sheet of adhesive composition prepared by the above-mentioned process and put between a wooden plate and polyester sheet as in Example 3. The hot pressed bonded mass had a peel strength of 7.6 kg/2.5 cm width.

CONTROL 10

An adhesive composition was prepared in substantially the same manner as in Example 3, excepting that the proportion of the fumaric acid used in Example 3 was changed to 150 parts by weight. A sheet molded from the adhesive composition thus prepared was held between an aluminium foil and high density polyethylene sheet as in Example 3 with hot pressing conducted in the same manner as in Example 3. The hot pressed bonded mass had a peel strength of 3.2 kg/2.5 cm width.

Hot pressing was carried out in substantially the same manner as described above, excepting that the high density polyethylene sheet used in forming a bonded mass was replaced by the polyvinyl chloride sheet used in Example 3. The hot pressed bonded mass had a peel strength of 1.8 kg/2.5 cm width.

Hot pressing was effected in the same manner as in Example 3 of a sheet of adhesive composition prepared by the above-mentioned process and placed between a wooden plate and polyester sheet as in Example 3. The hot pressed mass had a peel strength of 1.1 kg/2.5 cm width.

CONTROL 11

An adhesive composition was prepared in substantially the same manner as in Example 3, excepting that the dicumyl peroxide used in Example 3 was omitted. The adhesive composition thus prepared was molded into a sheet, which was held between an aluminium foil and high density polyethylene sheet as in Example 3, with hot pressing performed in the same manner as in Example 3. The hot pressed bonded mass had a peel strength of 2.1 kg/2.5 cm width.

Hot pressing was carried out in substantially the same manner as described above, excepting that the high density polyethylene sheet used in forming a bonded mass was replaced by the polyvinyl chloride sheet used in Example 3. The hot pressed bonded mass had a peel strength of 3.1 kg/2.5 cm width.

Hot pressing was effected in the same manner as in Example 3 of a sheet of adhesive composition prepared by the above-mentioned process and held between a wooden plate and polyester sheet as in Example 3. The hot pressed bonded mass had a peel strength of 6.2 kg/2.5 cm width.

CONTROL 12

An adhesive composition was prepared in substantially the same manner as in Example 3, excepting that the proportion of the dicumyl peroxide used in Example 3 was changed to 15 parts by weight. An attempt was made to mold the adhesive composition thus prepared into a sheet using a T-die extruder as in Example 3, but failed due to the occurrence of a cross-linking reaction during molding.

CONTROL 13

An adhesive composition was prepared in substantially the same manner as in Example 3, excepting that the proportion of the 2,6-di-tert-butyl-4-methoxyphenol used in Example 3 was changed to 8.0 parts by weight. The adhesive composition thus prepared was molded into a sheet, which was placed between an aluminium foil and high density polyethylene sheet as in Example 3, with hot pressing carried out in the same manner as in Example 3. The hot pressed bonded mass had a peel strength of 4.2 kg/2.5 cm width.

Hot pressing was carried out in substantially the same manner as described above, excepting that the high density polyethylene sheet used in forming a bonded mass was replaced by the polyvinyl chloride sheet used in Example 3. The hot pressed bonded mass had a peel strength of 1.2 kg/2.5 cm width.

Hot pressing was carried out in the same manner as in Example 3 of a sheet of adhesive composition prepared by the above-mentioned process and held between a wooden plate and polyester sheet as in Example 3, with hot pressing effected in the same manner as in Example 3. The hot pressed bonded mass had a peel strength of 1.3 kg/2.5 cm width.

EXAMPLE 4

An adhesive composition was prepared in substantially the same manner as in Example 3, excepting that the dibutyl-tin dilaurate used in Example 3 was omitted. The adhesive composition thus prepared was molded into a sheet which was held between an aluminium foil and high density polyethylene sheet as in Example 3, with hot pressing carried out in the same manner as in Example 3. The hot pressed bonded mass had a peel strength of 13.1 kg/2.5 cm width.

Hot pressing was performed in substantially the same manner as described above, excepting that the high density polyethylene sheet used in forming a bonded mass was replaced by the polyvinyl chloride sheet used in Example 3. The hot pressed bonded mass had a peel strength of 17.3 kg/2.5 cm width.

Hot pressing was carried out in the same manner as in Example 3 of a sheet of adhesive composition prepared by the above-mentioned process and disposed between a wooden plate and polyester sheet as in Example 3. The hot pressed bonded mass had a peel strength of 16.2 kg/2.5 cm width.

EXAMPLE 5

An adhesive composition was prepared in substantially the same manner as in Example 3, excepting that the 2,6-di-tert-butyl-4-methoxyphenol used in Example 3 was omitted. The adhesive composition thus prepared was molded into a sheet, which was held between an aluminium foil and high density polyethylene sheet as in Example 3, with hot pressing carried out in the same manner as in Example 3. The hot pressed bonded mass had a peel strength of 16.2 kg/2.5 cm width.

Hot pressing was performed in substantially the same manner as described above, excepting that the high density polyethylene sheet used in forming a bonded mass was replaced by the polyvinyl chloride sheet used in Example 3. The hot pressed bonded mass had a peel strength of 19.1 kg/2.5 cm width.

Hot pressing was conducted in the same manner as in Example 3 of a sheet of adhesive composition prepared by the above-mentioned process and held between a wooden plate and polyester sheet as in Example 3. The hot pressed bonded mass had a peel strength of 18.7 kg/2.5 cm width.

EXAMPLE 6

Pellets were formed, as in Example 1, by an extruder set at 130°C while kneading an adhesive composition consisting of a mixture of 100 parts by weight of ethylenevinyl acetate copolymer containing 26% by weight of vinyl acetate (manufactured by Toyo Soda Mfg. Co. under a trade name "Ultrathene UE-634"), 5 parts by weight of chlorinated polyethylene containing 40% by weight of chlorine (residual crystallinity of 45%) obtained by chlorinating polyethylene of about 85,000 molecular weight, 1 part by weight of maleic acid, 0.5 part by weight of dicumyl peroxide, 0.1 part by weight of 2,6-di-tert-butyl-4-methylphenol and 0.25 part by weight of dibutyl-tin dilaurate (5% by weight based on the chlorinated polyethylene). The pellets thus formed were molded into an about 100-micron thick sheet by a T-die extruder set at 110°C.

Hot pressing was carried out in the same manner as in Example 1 of the adhesive sheet thus molded and placed between an aluminium foil and high density polyethylene sheet as in Example 1. The hot pressed bonded mass had a peel strength of 19.0 kg/2.5 cm width.

Hot pressing was carried out in substantially the same manner as described above, excepting that the high density polyethylene sheet used in forming a bonded mass was replaced by the polyvinyl chloride sheet used in Example 1. The hot pressed bonded mass had a peel strength of 24.1 kg/2.5 cm width.

Hot pressing was conducted in the same manner as in Example 1 of a sheet of adhesive composition prepared by the above-mentioned process and placed between a wooden plate and polyester sheet as in Example 1. The hot pressed bonded mass had a peel strength of 21.0 kg/2.5 cm width.

EXAMPLE 7

Pellets were formed, as in Example 1, by an extruder set at 120°C while kneading an adhesive composition consisting of a mixture of 100 parts by weight of the ethylenevinyl acetate copolymer used in Example 6, 50 parts by weight of chlorinated polyethylene containing 40% by weight of chlorine (residual crystallinity of 5.0% by weight) obtained by chlorinating polyethylene of 200,000 average molecular weight, 1.0 part by weight of 2-methylene glutaric acid, 1.0 part by weight of tert-butyl peroxy stearate, 0.2 part by weight of 4,4'-thiobis (3-methyl-6-tert-butylphenol), 0.5 part by weight of calcium stearate and 0.5 part by weight of barium stearate, the last mentioned two components being added as acid-acceptors and their proportions respectively accounting for 1.0% by weight based on the chlorinated polyethylene. The pellets thus formed were molded into an about 100-micron thick sheet by a T-die extruder set at 110°C.

The adhesive sheet thus molded was put between an aluminium foil and high density polyethylene sheet as in Example 1, with hot pressing conducted in the same manner as in Example 1. The hot pressed bonded mass had a peel strength of 13.4 kg/2.5 cm width.

Hot pressing was performed in substantially the same manner as described above, excepting that the high density polyethylene sheet used in forming a bonded mass was replaced by the polyvinyl chloride used in Example 1. The hot pressed bonded mass had a peel strength of 12.1 kg/2.5 cm width.

Hot pressing was conducted in the same manner as in Example 1 of a sheet of adhesive composition prepared by the above-mentioned process and disposed between a wooden plate and polyester sheet as in Example 1. The hot pressed bonded mass had a peel strength of 15.6 kg/2.5 cm width.

EXAMPLE 8

Pellets were formed, as in Example 7, by an extruder set as 120°C while kneading an adhesive composition consisting of a mixture of 100 parts by weight of ethylenevinyl acetate copolymer used in Example 6, 30 parts by weight of chlorinated polyethylene containing 45% by weight of chlorine (residual crystallinity of 10.8%) obtained by chlorinating polyethylene of about 200,000 average molecular weight, 3.0 parts by weight of maleic acid, 5.0 parts by weight of dicumyl peroxide, 1.0 part by weight of 1,3,5-trimethyl-2,4,6-tris(3,5-di-tert-butyl-4-hydroxybenzyl) benzene, 0.3 part by weight of calcium stearate and 0.3 part by weight of barium stearate, the last mentioned two components being added as acid-acceptors and their proportions respectively accounting for 1.0% by weight based on the chlorinated polyethylene. The pellets thus formed were molded into an about 100-micron thick sheet by a T-die extruder set at 110°C.

Hot pressing was performed in the same manner as in Example 1 of a sheet of adhesive composition prepared by the above-mentioned process and held between an aluminium foil and high density polyethylene sheet. The hot pressed bonded mass had a peel strength of 14.5 kg/2.5 cm width.

Hot pressing was conducted in substantially the same manner as described above, excepting that the high density polyethylene sheet used in forming a bonded mass was replaced by the polyvinyl chloride sheet used in Example 1. The hot pressed bonded mass had a peel strength of 18.9 kg/2.5 cm width.

Hot pressing was performed in the same manner as in Example 1 of a sheet of adhesive composition prepared by the process described above and held between a wooden plate and polyester sheet as in Example 1. The hot pressed bonded mass had a peel strength of 19.1 kg/2.5 cm width.

EXAMPLE 9

Pellets were formed, as in Example 6, by an extruder set at 120°C while kneading an adhesive composition consisting of a mixture of 100 parts by weight of ethylenevinyl acetate copolymer containing 10% by weight of vinyl acetate (manufactured by Sumitomo Chemical Co., Ltd. under a trade name "Evatate D-2021"), 20.0 parts by weight of chlorinated polyethylene containing 45% by weight of chlorine (residual crystallinity of 10.8%) obtained by chlorinating polyethylene of about 200,000 average molecular weight, 20.0 parts by weight of fumaric acid, 0.05 part by weight of 2,5-dimethylhexane-2,5-dihydroperoxide, 0.1 part by weight of 2,6-di-tert-butyl-4-methylphenol, 0.2 part by weight of calcium stearate, and 0.2 part by weight of barium stearate, the last-mentioned two components being added as acid-acceptors and their proportions respectively accounting for 1.0% by weight based on the chlorinated polyethylene. The pellets thus formed were molded into an about 100-micron thick sheet by a T-die extruder set at 110°C.

Hot pressing was carried out in the same manner as in Example 1 a sheet of adhesive composition prepared by the above-mentioned process and placed between an aluminium foil and high density polyethylene sheet as in Example 1. The hot pressed bonded mass had a peel strength of 17.6 kg/2.5 cm width.

Hot pressing was performed in substantially the same manner as described above, excepting that the high density polyethylene sheet used in forming a bonded mass was replaced by the polyvinyl chloride sheet used in Example 1. The hot pressed bonded mass had a peel strength of 19.1 kg/2.5 cm width.

Hot pressing was conducted in the same manner as in Example 1 of a sheet of adhesive composition prepared by the above-mentioned process and placed between a wooden plate and polyester sheet as in Example 1. The hot pressed bonded mass had a peel strength of 19.8 kg/2.5 cm width.

EXAMPLE 10

Pellets were formed, 136 in Example 6, by an extruder set at 120°C while kneading an adhesive composition consisting of a mixture of 100 parts by weight of ethylenevinyl acetate copolymer containing 25% by weight of vinyl acetate (manufactured by Sumitomo Chemical Co., Ltd. under a trade name "Evatate K-2010"), 10.0 parts by weight of chlorinated polyethylene containing 35% by weight of chlorine (residual crystallinity of 4.8%) obtained by chlorinating polyethylene of about 120,000 average molecular weight, 1.0 part by weight of maleic acid, 0.5 part by weight of 2,5-dimethyl-2,5-dibenzoyl peroxyhexane, 0.2 part by weight of 2,6-di-tert-butyl-4-methylphenol. 0.1 part by weight of calcium stearate and 0.1 part by weight of barium stearate, the last mentioned two components being added as acid-acceptors and their proportions accounting for 1.0% by weight based on the chlorinated polyethylene. The pellets thus formed were molded into an about 100-micron thick sheet by a T-die extruder set at 110°C.

Hot pressing was carried out in the same manner as in Example 1 of an adhesive sheet thus molded and placed between an aluminium foil and high density polyethylene sheet as in Example 1. The hot pressed bonded mass had a peel strength of 14.5 kg/2.5 cm width.

Hot pressing was conducted in substantially the same manner as described above, excepting that the high density polyethylene sheet used in forming a bonded mass was replaced by the polyvinyl chloride sheet used in Example 1. The hot pressed bonded mass had a peel strength of 16.2 kg/2.5 cm width.

Hot pressing was performed in the same manner as in Example 1 of a sheet of adhesive composition prepared by the above-mentioned process and held between a wooden plate and polyester sheet as in Example 1. The hot pressed bonded mass had a peel strength of 17.1 kg/2.5 cm width.

EXAMPLE 11

An adhesive composition consisting of a mixture of 100 parts by weight of ethylene-vinyl acetate copolymer used in Example 10, 10.0 parts by weight of chlorinated polyethylene containing 40% by weight of chlorine (residual crystallinity of 45%) obtained by chlorinating polyethylene of about 85,000 average molecular weight, 1.0 part by weight of fumaric acid, 0.5 part by weight of dibenzoyl peroxide, 0.2 part by weight of 2,2'-methylene-bis(4-methyl-6-tert-butylphenol) and 0.2 part by weight of dibutyl-tin dilaurate (2% by weight based on the chlorinated polyethylene) was kneaded 5 minutes in a Banbury mixer set at 110°C. The kneaded mass was molded into an about 100-micron thick sheet by a T-die extruder set at 110°C.

Hot pressing was carried out in the same manner as in Example 1 of the adhesive sheet thus molded and disposed between an aluminium foil and high density polyethylene sheet as in Example 1. The hot pressed bonded mass had a peel strength of 18.2 kg/2.5 cm width.

Hot pressing was performed in substantially the same manner as described above, excepting that the high density polyethylene sheet used in forming a bonded mass was replaced by the polyvinyl chloride sheet used in Example 1. The hot pressed bonded mass had a peel strength of 17.3 kg/2.5 cm width.

Hot pressing was effected in the same manner as in Example 1 of a sheet of adhesive composition prepared by the above-mentioned process and held between a wooden plate and polyester sheet as in Example 1. The hot pressed bonded mass had a peel strength of 18.1 kg/2.5 cm width.

EXAMPLE 12

Pellets were formed, as in Example 1, by an extruder set at 130°C while kneading an adhesive composition consisting of a mixture of 100 parts by weight of ethylenevinyl acetate copolymer containing 26% by weight of vinyl acetate (manufactured by Toyo Soda Co. under a trade name "Ultrathene UE-634"), 10.0 parts by weight of chlorinated polyethylene containing 30% by weight of chlorine (residual crystallinity of 5.0%) obtained by chlorinating polyethylene of about 100,000 average molecular weight, 10.0 parts by weight of fumaric acid, 0.1 part by weight of dicumyl peroxide, 0.1 part by weight of 2,6-di-tert-butyl-4-methoxyphenol and 0.2 part by weight of dibutyl-tin maleate (2.0% by weight based on the chlorinated polyethylene). The pellets thus formed were molded into an about 100-micron thick sheet by a T-die extruder set at 120°C.

Hot pressing was carried out in the same manner as in Example 1 of the adhesive sheet thus molded by the above-mentioned process and held between an aluminium foil and high density polyethylene sheet as in Example 1. The hot pressed bonded mass had a peel strength of 16.8 kg/2.5 cm width.

Hot pressing was conducted in substantially the same manner as described above, excepting that the high density polyethylene sheet used in forming a bonded mass was replaced by the polyvinyl chloride sheet used in Example 1. The hot pressed bonded mass had a peel strength of 15.2 kg/2.5 cm width.

Hot pressing was effected in the same manner as in Example 1 of a sheet of adhesive composition prepared by the above-mentioned process and placed between a wooden plate and polyester sheet as in Example 1. The hot pressed bonded mass had a peel strength of 15.6 kg/2.5 cm width.

EXAMPLE 13

Pellets were formed, as in Example 6, by an extruder set at 130°C with kneading, excepting that the chlorinated polyethylene used in Example 6 was replaced by another form of chlorinated polyethylene containing 45% by weight of chlorine (residual crystallinity of 10.8%) obtained by chlorinating polyethylene of about 200,000 average molecular weight. The pellets thus formed were molded into an about 100-micron thick sheet by a T-die extruder set at 110°C.

Hot pressing was performed, as in Example 6, of an adhesive sheet thus molded and disposed between an aluminium foil and high density polyethylene sheet as in Example 6. The hot pressed bonded mass had a peel strength of 17.0 kg/2.5 cm width.

Hot pressing was carried out in substantially the same manner as described above, excepting that the high density polyethylene used in forming a bonded mass was replaced by the polyvinyl chloride sheet used in Example 6. The hot pressed bonded mass had a peel strength of 21.5 kg/2.5 cm width.

Hot pressing was carried out in the same manner as in Example 6 of a sheet of adhesive composition prepared by the above-mentioned process and placed between a wooden plate and polyester sheet as in Example 6. The hot pressed bonded mass had a peel strength of 22.0 kg/2.5 cm width.

EXAMPLE 14

Pellets were formed, as in Example 6, by an extruder set at 130°C with kneading, excepting that the chlorinated polyethylene used in Example 6 was replaced by another from of chlorinated polyethylene containing 35% by weight of chlorine (residual crystallinity of 4.8%) obtained by chlorinating polyethylene of about 120,000 average molecular weight. The pellets thus formed were molded into an about 100-micron thick sheet by a T-die extruder set at 110°C.

Hot pressing was performed in the same manner, as in Example 6, of a sheet of adhesive composition prepared by the above-mentioned process and placed between an aluminium foil and high density polyethylene sheet as in Example 6. The hot pressed bonded mass had a peel strength of 17.2 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 18.1 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 19.1 kg/2.5 cm width.

EXAMPLE 15

Pellets were formed, as in Example 6, by an extruder set at 130°C with kneading, excepting that the chlorinated polyethylene used in Example 6 was replaced by another form of chlorinated polyethylene containing 40% by weight of chlorine (residual crystallinity of 5.0%) obtained by chlorinating polyethylene of about 200,000 average molecular weight. The pellets thus formed were molded into an about 100-micron thick sheet by a T-die extruder set at 110°C.

Hot pressing was performed in the same manner as in Example 6 of a sheet of adhesive composition prepared by the above-mentioned process and held between an aluminium foil and high density polyethylene sheet as in Example 6. The hot pressed bonded mass had a peel strength of 17.5 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 20.8 kg/2.5 cm width.

Hot pressing was carried out, in the same manner as in Example 6, of a sheet of adhesive composition prepared by the above-mentioned process and held between a wooden plate and polyester as in Example 6. The hot pressed bonded mass had a peel strength of 21.2 kg/2.5 cm width.

EXAMPLE 16

Pellets were formed as in Example 6, by an extruder set at 130°C with kneading, excepting that the proportion of chlorinated polyethylene used in Example 6 was changed to 10.0 parts by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and disposed between an aluminium foil and high density polyethylene sheet as in Example 6. The hot pressed bonded mass had a peel strength of 16.4 kg/2.5 cm width.

Hot pressing was conducted in substantially the same manner as described above, excepting that the high density polyethylene sheet used in forming a bonded mass was replaced by the polyvinyl chloride sheet used in Example 6. The hot pressed bonded mass had a peel strength of 20.9 kg/2.5 cm width.

Hot pressing was effected in the same manner as in Example 6 of a sheet of adhesive composition prepared by the above-mentioned process and placed between a wooden plate and polyester sheet as in Example 6. The hot pressed bonded mass had a peel strength of 21.3 kg/2.5 cm width.

EXAMPLE 17

Pellets were formed, as in Example 6, by an extruder set at 130°C with kneading, excepting that the proportion of chlorinated polyethylene used in Example 6 was changed to 20.0 parts by weight. The pellets thus formed were molded into an about 100-micron thick sheet by a T-die extruder set at 110°C.

Hot pressing was conducted, in the same manner as in Example 6, of a sheet of adhesive composition prepared by the above-mentioned process and put between an aluminium foil and high density polyethylene sheet as in Example 6. The hot pressed mass had a peel strength of 15.8 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 21.5 kg/2.5 cm width.

Hot pressing was performed, in the same manner as in Example 6, of a sheet of adhesive composition prepared by the above-mentioned process and placed between a wooden plate and polyester sheet as in Example 6. The hot pressed bonded mass had a peel strength of 20.7 kg/2.5 cm width.

EXAMPLE 18

Pellets were formed, as in Example 6, by an extruder set at 130°C with kneading, excepting that the proportion of the chlorinated polyethylene used in Example 6 was changed to 40.0 parts by weight. The pellets thus formed were molded into an about 100 -micron thick sheet by a T-die extruder set at 110°C.

Hot pressing was conducted, in the same manner as in Example 6, of a sheet of adhesive composition prepared by the above-mentioned process and held between an aluminium foil and high density polyethylene sheet as in Example 6. The hot pressed bonded mass had a peel strength of 15.1 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 19.2 kg/2.5 cm width.

Hot pressing was effected, in the same manner as in Example 6, of a sheet of adhesive composition prepared by the above-mentioned process and disposed between a wooden plate and polyester sheet as in Example 6. The hot pressed bonded mass had a peel strength of 18.6 kg/2.5 cm width.

CONTROL 14

Pellets were formed, as in Example 6, by an extruder set at 130°C with kneading, excepting that the chlorinated polyethylene used in Example 6 to prepare an adhesive composition was omitted. The pellets thus formed were molded into an about 100-micron thick sheet by a T-die extruder set at 110°C.

Hot pressing was carried out, in the same manner as in Example 6, of a sheet of adhesive composition prepared by the above-mentioned process and disposed between an aluminium foil and high density polyethylene sheet as in Example 6. The hot pressed bonded mass had a peel strength of 16.2 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 2.1 kg/2.5 cm width.

Hot pressing was carried out, in the same manner as in Example 6, of a sheet of adhesive composition prepared by the above-mentioned process and disposed between a wooden plate and polyester sheet as in Example 6. The hot pressed bonded mass had a peel strength of 1.2 kg/2.5 cm width.

CONTROL 15

Pellets were formed, as in Example 6, by an extruder set at 130°C with kneading, excepting that the proportion of chlorinated polyethylene used in Example 6 in preparing an adhesive composition was changed to 200 parts by weight. The pellets thus formed were molded into an about 100-micron thick sheet by a T-die extruder set at 110°C.

Hot pressing was performed, in the same manner as in Example 6, of a sheet of adhesive composition prepared by the above-mentioned process and placed between an aluminium foil and high density polyethylene sheet as in Example 6. The hot pressed bonded mass had a peel strength of 1.9 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 6.8 kg/2.5 cm width.

Hot pressing was carried out, in the same manner as in Example 6, of a sheet of adhesive composition prepared by the above-mentioned process and placed between a wooden plate and polyester sheet as in Example 6. The hot pressed bonded mass had a peel strength of 3.6 kg/2.5 cm width.

EXAMPLE 19

Pellets were formed as in Example 6 by an extruder set at 120°C with kneading, excepting that the ethylene-vinyl acetate copolymer used in Example 6 to prepare an adhesive composition was replaced by another form of ethylene-vinyl chloride copolymer containing 20% by weight of vinyl acetate (manufactured by Toyo Soda Co. under a trade name "Ultrathene UE-631"). The pellets thus formed were molded into an about 100-micron thick sheet by a T-die extruder set at 120°C.

Hot pressing was carried out, in the same manner as in Example 6, of a sheet of adhesive composition prepared by the above-mentioned process and disposed between an aluminum foil and high density polyethylene sheet as in Example 6. The hot pressed bonded mass had a peel strength of 17.5 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 18.1 kg/2.5 cm width.

Hot pressing was conducted in the same manner as in Example 6 of a sheet of adhesive composition prepared by the above-mentioned process and placed between a wooden plate and polyester sheet as in Example 6. The hot pressed bonded mass had a peel strength of 18.2 kg/2.5 cm width.

EXAMPLE 20

Pellets were formed, as in Example 6, by an extruder set at 130°C with kneading, excepting that the ethylene-vinyl acetate used in Example 6 to prepare an adhesive composition was replaced by another form of ethylene-vinyl acetate copolymer containing 10% by weight of vinyl acetate (manufactured by Sumitomo Chemical Co., Ltd. under a trade name "Evatate D-2021"). The pellets thus formed were molded into an about 100-micron thick sheet by a T-die extruder set at 110 C.

Hot pressing was carried out, in the same manner as in Example 6, of a sheet of adhesive composition prepared by the above-mentioned process and held between an aluminium foil and high density polyethylene sheet as in Example 6. The hot pressed bonded mass had a peel strength of 19.3 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 16.1 kg/2.5 cm width.

Hot pressing was performed, in the same manner as in Example 6, of a sheet of adhesive composition prepared by the above-mentioned process and put between a wooden plate and polyester sheet as in Example 6. The hot pressed bonded mass had a peel strength of 15.4 kg/2.5 cm width.

CONTROL 16

Pellets were formed, as in Example 6, by an extruder set at 120°C with kneading, excepting that the ethylene-vinyl acetate copolymer used in Example 6 to prepare an adhesive composition was replaced by another form of ethylene-vinyl acetate copolymer containing 60% by weight of vinyl acetate (manufactured by Nihon Synthetic Chem. Ind. Co., Ltd. under a trade name "Soarlex CJ"). The pellets thus formed were molded into an about 100-micron thick sheet by a T-die extruder set at 110°C. However, the formation of said sheet was accompanied with great difficulties due to the occurrence of blocking.

EXAMPLE 21

Pellets were formed, as in Example 6, by an extruder set at 130°C with kneading, excepting that the maleic acid used in Example 6 as an unsaturated carboxylic acid to prepare an adhesive composition was replaced by 2-methylene glutaric acid. The pellets thus formed were molded into an about 100-micron thick sheet by a T-die extruder set at 110°C.

Hot pressing was effected, in the same manner as in Example 6, of a sheet of adhesive composition prepared by the above-mentioned process and disposed between an aluminium foil and high density polyethylene sheet as in Example 6. The hot pressed bonded mass had a peel strength of 19.1 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 19.2 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength of 16.5 kg/2.5 cm width.

EXAMPLE 22

Pellets were formed, as in Example 6, by an extruder set at 130°C with kneading, excepting that the maleic acid used in Example 6 as an unsaturated carboxylic acid was replaced by fumaric acid. The pellets thus formed were molded into an about 100-micron thick sheet by a T-die extruder set at 110°C.

Hot pressing was performed, in the same manner as in Example 6, of a sheet of adhesive composition prepared by the above-mentioned process and placed between an aluminium foil and high density polyethylene sheet as in Example 6. The hot pressed bonded mass had a peel strength of 17.6 kg/2.5 cm width.

Hot pressing was conducted in the same manner as described above, excepting that the high density polyethylene sheet used in forming a bonded mass was replaced by the polyvinyl chloride sheet used in Example 6. The hot pressed bonded mass had a peel strength of 18.2 kg/2.5 cm width.

Hot pressing was carried out, in the same manner as in Example 6, of a sheet of adhesive composition prepared by the above-mentioned process and disposed between a wooden plate and polyester sheet as in Example 6. The hot pressed bonded mass had a peel strength of 18.5 kg/2.5 cm width.

EXAMPLE 23

Pellets were formed, as in Example 6, by an extruder set at 130°C with kneading, excepting that the maleic acid used in Example 6 as an unsaturated carboxylic acid to prepare an adhesive composition was replaced by crotonic acid. The pellets thus formed were molded into an about 100-micron thick sheet by a T-die extruder set at 110°C.

Hot pressing was performed, in the same manner as in Example 6, of a sheet of adhesive composition prepared by the above-mentioned process and placed between an aluminium foil and high density polyethylene sheet as in Example 6. The hot pressed bonded mass had a peel strength of 19.1 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 18.5 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 19.1 kg/2.5 cm width.

EXAMPLE 24

Pellets were formed, as in Example 6, by an extruder set at 130°C with kneading, excepting that the maleic acid used in Example 6 as unsaturated carboxylic acid to prepare an adhesive composition was replaced by itaconic acid. The pellets thus formed were molded into an about 100-micron thick sheet by a T-die extruder set at 110°C.

Hot pressing was carried out, in the same manner as in Example 6, of a sheet of adhesive composition prepared by the above-mentioned process and held between an aluminium foil and high density polyethylene sheet as in Example 6. The hot pressed bonded mass had a peel strength of 18.2 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 19.1 kg/2.5 cm width.

Hot pressing was effected, in the same manner as in Example 6, of a sheet of adhesive composition prepared by the above-mentioned process and placed between a wooden plate and polyester sheet as in Example 6. The hot pressed bonded mass had a peel strength of 16.2 kg/2.5 cm width.

EXAMPLE 25

Pellets were formed, as in Example 6, by an extruder set at 130°C with kneading, excepting that the maleic acid used in Example 6 as unsaturated carboxylic acid was replaced by citraconic acid. The pellets thus formed were molded into an about 100-micron thick sheet by a T-die extruder set at 110°C.

Hot pressing was carried out, in the same manner as in Example 6, of a sheet of adhesive composition prepared by the above-mentioned process and disposed between an aluminium foil and high density polyethylene sheet as in Example 6. The hot pressed bonded mass had a peel strength of 18.3 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 16.5 kg/2.5 cm width.

Hot pressing was performed, in the same manner as in Example 6, of a sheet of adhesive composition prepared by the above-mentioned process and held between a wooden plate and polyester sheet as in Example 6. The hot pressed bonded mass had a peel strength of 16.3 kg/2.5 cm width.

Example 26

Pellets were formed, as in Example 6, by an extruder set at 130°C with kneading, excepting that the proportion of the maleic acid used in Example 6 as unsaturated carboxylic acid was changed to 0.5 part by weight. The pellets thus formed were molded into an about 100-micron thick sheet by a T-die extruder set at 110°C.

HOt pressing was performed, in the same manner as in Example 6, of a sheet of adhesive composition prepared by the above-mentioned process and held between an aluminium foil and high density polyethylene sheet as in Example 6. The hot pressed bonded mass had a peel strength of 18.4 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 21.1 kg/2.5 cm width.

Hot pressing was performed, in the same manner as in Example 6, of a sheet of adhesive composition prepared by the above-mentioned process and held between a wooden plate and polyester sheet as in Example 6. The hot pressed bonded mass had a peel strength of 20.3 kg/2.5 cm width.

EXAMPLE 27

Pellets were formed, as in Example 6, by an extruder set at 130°C with kneading, excepting that the proportion of the maleic acid used in Example 6 as unsaturated carboxylic acid was changed to 2.0 parts by weight. The pellets thus formed were molded into an about 100-micron thick sheet by a T-die extruder set at 100°C.

Hot pressing was conducted, in the same manner as in Example 6, of a sheet of adhesive composition prepared by the above-mentioned process and placed between an aluminium foil and high density polyethylene sheet as in Example 6. The hot pressed bonded mass had a peel strength of 18.6 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 20.3 kg/2.5 cm width.

Hot pressing was performed, in the same manner as in Example 6, of a sheet of adhesive composition prepared by the above-mentioned process and held between a wooden plate and polyester sheet as in Example 6. The hot pressed bonded mass had a peel strength of 20.7 kg/2.5 cm width.

EXAMPLE 28

Pellets were formed, as in Example 6, by an extruder set at 130°C with kneading, excepting that the proportion of maleic acid used in Example 6 as unsaturated carboxylic acid to prepare an adhesive composition was changed to 5.0 parts by weight. The pellets thus formed were molded into an about 100-micron thick sheet by a T-die extruder set at 110°C.

Hot pressing was performed, in the same manner as in Example 6, of a sheet of adhesive composition thus prepared and disposed between an aluminium foil and high density polyethylene sheet as in Example 6. The hot pressed bonded mass had a peel strength of 19.2 kg/2.5 cm widht.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 21.2 kg/2.5 cm width.

Hot pressing was carried out, in the same manner as in Example 6, of a sheet of adhesive composition prepared by the above-mentioned process and held between a wooden plate and polyester sheet as in Example 6. The hot pressed bonded mass had a peel strength of 19.8 kg/2.5 cm width.

EXAMPLE 29

Pellets were formed as in Example 6, by an extruder set at 110°C with kneading, excepting that the proportion of the maleic acid used in Example 6 as unsaturated carboxylic acid to prepare an adhesive composition was changed to 10.0 parts by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 16.5 kg/2.5 cm width.

Hot pressing was conducted in substantially the same manner as described above, excepting that the high density polyethylene sheet used in forming a bonded mass was replaced by the polyvinyl chloride sheet used in Example 6. The hot pressed bonded mass had a peel strength of 15.1 kg/2.5 cm width.

Hot pressing was carried out, in the same manner as in Example 6, of a sheet of adhesive composition prepared by the above-mentioned process and held between a wooden plate and polyester sheet as in Example 6. The hot pressed bonded mass had a peel strength of 15.8 kg/2.5 cm width.

CONTROL 17

Pellets were formed, as in Example 6, by an extruder set at 130°C with kneading, excepting that the maleic acid used in Example 6 as unsaturated carboxylic acid to prepare an adhesive composition was omitted. The pellets thus formed were molded into an about 100-micron thick sheet by a T-die extruder set at 110°C.

Hot pressing was performed, in the same manner as in Example 6, of a sheet of adhesive composition prepared by the above-mentioned process and disposed between an aluminium foil and high density polyethylene sheet as in Example 6. The hot pressed bonded mass had a peel strength of 2.1 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 2.1 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 1.5 kg/2.5 cm width.

CONTROL 18

Substantially the same proportions of components of adhesive composition as used in Example 6 were kneaded 3 minutes by a Banbury mixer set at 100°C excepting that the proportion of maleic acid used in Example 6 as unsaturated carboxylic acid was changed to 200 parts by weight. The resultant mixture was rolled into a sheet, which was later cut in pellets by a sheet cutter. The pellets thus formed were molded into an about 100-micron thick sheet by a T-die extruder set at 100°C.

Hot pressing was carried out, in the same manner as in Example 6, of a sheet of adhesive composition thus prepared and placed between an aluminium foil and high density polyethylene sheet as in Example 6. The hot pressed bonded mass had a peel strength of 1.8 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed mass had a peel strength of 3.2 kg/2.5 cm width.

Hot pressing was effected, in the same manner as in Example 6, of a sheet of adhesive composition prepared by the above-mentioned process and placed between a wooden plate and polyester sheet as in Example 6. The hot pressed bonded mass had a peel strength of 2.2 kg/2.5 cm width.

EXAMPLE 30

Pellets were formed, as in Example 6, by an extruder set at 130°C with kneading, excepting that the dicumyl peroxide used in Example 6 as an organic peroxide to prepare an adhesive composition was replaced by 2,5-dimethylhexane-2,5-dihydroperoxide. The pellets thus formed were molded into an about 100-micron thick sheet by a T-die extruder set at 110°C.

Hot pressing was carried out in the same manner as in Example 6 of a sheet of adhesive composition prepared by the above-mentioned process and placed between an aluminium foil and high density polyethylene sheet as in Example 6. The hot pressed bonded mass had a peel strength of 16.2 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 18.1 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength of 19.3 kg/2.5 cm width.

EXAMPLE 31

Pellets were formed, as in Example 6, by an extruder set at 140°C with kneading, excepting that the dicumyl peroxide used as an organic peroxide in Example 6 was replaced by tert-butyl peroxy stearate. The pellets thus formed were molded into an about 100-micron thick sheet by a T-die extruder set at 120°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 15.1 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 19.4 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 17.3 kg/2.5 cm width.

EXAMPLE 32

Pellets were formed, as in Example 6, by an extruder set at 130°C with kneading, excepting that the dicumyl peroxide used as an organic peroxide in Example 6 to prepare an adhesive composition was replaced by 2,5-dimethyl-2,5-dibenzoyl peroxy hexane. The pellets thus formed were molded into an about 100-micron thick sheet by a T-die extruder set at 110°C.

Hot pressing was conducted, in the same manner as in Example 6, of a sheet of adhesive composition prepared by the above-mentioned process and placed between an aluminium foil and high density polyethylene sheet as in Example 6. The hot pressed bonded mass had a peel strength of 16.2 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 19.8 kg/2.5 cm width.

Hot pressing was carried out, in the same manner as in Example 6, of a sheet of adhesive composition prepared by the above-mentioned process and held between a wooden plate and polyester sheet. The hot pressed bonded mass had a peel strength of 20.3 kg/2.5 cm width.

EXAMPLE 33

Pellets were formed, as in Example 6, by an extruder set at 130°C with kneading, excepting that the dicumyl peroxide in Example 6 to prepare an adhesive composition was replaced by benzoyl peroxide. The pellets thus formed were molded into an about 100-micron thick sheet by a T-die extruder set at 110°C.

Hot pressing was carried out, in the same manner as in Example 6, of a sheet of adhesive composition prepared by the above-mentioned process and held between an aluminium foil and high density polyethylene sheet as in Example 6. The hot pressed bonded mass had a peel strength of 19.8 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 20.3 kg/2.5 cm width.

Hot pressing was performed, in the same manner as in Example 6, of a sheet of adhesive composition prepared by the above-mentioned process and placed between a wooden plate and polyester sheet as in Example 6. The hot pressed bonded mass had a peel strength of 21.0 kg/2.5 cm width.

EXAMPLE 34

Pellets were formed, as in Example 6, by an extruder set at 130°C with kneading, excepting that the dicumyl peroxide used as an organic peroxide in Example 6 to prepare an adhesive composition was replaced by 1,1-bis-tert-butylperoxy-3,3,5-trimethyl cyclohexane. The pellets thus formed were molded into an about 100-micron thick sheet by a T-die extruder set at 110°C.

Hot pressing was carried out, in the same manner as in Example 6, of a sheet of adhesive composition prepared by the above-mentioned process and disposed between an aluminium foil and high density polyethylene sheet as in Example 6. The hot pressed bonded mass had a peel strength of 17.2 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 20.1 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength of 19.3 kg/2.5 cm width.

EXAMPLE 35

Pellets were formed, as in Example 6, by an extruder set at 130°C with kneading, excepting that the proportion of dicumyl peroxide used as an organic peroxide in Example 6 to prepare an adhesive composition was changed to 0.1 part by weight. The pellets thus formed were molded into an about 100-micron thick sheet by a T-die extruder set at 110°C.

Hot pressing was performed, in the same manner as in Example 6, of a sheet of adhesive composition prepared by the above-mentioned process and placed between an aluminium foil and high density polyethylene sheet as in Example 6. The hot pressed bonded mass had a peel strength of 15.2 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 20.1 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 17.6 kg/2.5 cm width.

EXAMPLE 36

Pellets were formed, as in Example 6, by an extruder set at 130°C with kneading, excepting that the proportion of dicumyl peroxide used as an organic peroxide in Example 6 to prepare an adhesive composition was changed to 1.0 part by weight. The pellets thus formed were molded into an about 100-micron thick sheet by a T-die extruder set at 110°C.

Hot pressing was performed, in the same manner as in Example 6, of a sheet of adhesive composition prepared by the above-mentioned process and placed between an aluminium foil and high density polyethylene sheet as in Example 6. The hot pressed bonded mass had a peel strength of 18.3 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 21.2 kg/2.5 cm width.

Hot pressing was effected, in the same manner as in Example 6, of a sheet of adhesive composition prepared by the above-mentioned process and placed between a wooden plate and polyester sheet as in Example 6. The hot pressed bonded mass had a peel strength of 20.5 kg/2.5 cm width.

EXAMPLE 37

Pellets were formed, as in Example 6, by an extruder set at 130°C with kneading, excepting that the proportion of dicumyl peroxide used as an organic peroxide in Example 6 to prepare an adhesive composition was changed to 2.0 parts by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 19.1 kg/2.5 cm width.

Hot pressing was conducted in substantially the same manner as described above, excepting that the high density polyethylene sheet used in forming a bonded mass was replaced by the polyvinyl chloride sheet used in Example 6. The hot pressed bonded mass had a peel strength of 19.7 kg/2.5 cm width.

Hot pressing was performed, in the same manner as in Example 6, of a sheet of adhesive composition prepared by the above-mentioned process and put between a wooden plate and polyester sheet as in Example 6. The hot pressed bonded mass had a peel strength of 19.9 kg/2.5 cm width.

EXAMPLE 38

Pellets were formed, as in Example 6, by an extruder set at 130°C with kneading, excepting that the proportion of dicumyl peroxide used as an organic peroxide in Example 6 to prepare an adhesive composition was changed to 4.0 parts by weight. The pellets thus formed were molded into an about 100-micron thick sheet by a T-die extruder set at 120°C.

Hot pressing was carried out, in the same manner as in Example 6, of a sheet of adhesive composition prepared by the above-mentioned process and held between an aluminium foil and high density polyethylene sheet as in Example 6. The hot pressed bonded mass had a peel strength of 19.2 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 24.2 kg/2.5 cm width.

Hot pressing was performed, in the same manner as in Example 6, of a sheet of adhesive composition prepared by the above-mentioned process and placed between a wooden plate and polyester sheet as in Example 6. The hot pressed bonded mass had a peel strength of 20.3 kg/2.5 cm width.

CONTROL 19

Pellets were formed, as in Example 6, by an extruder set at 130°C with kneading, excepting that the dicumyl peroxide used as an organic peroxide in Example 6 to prepare an adhesive composition was omitted. The pellets thus formed were molded into an about 100-micron thick sheet by a T-die extruder set at 110°C.

Hot pressing was carried out, in the same manner as in Example 6, of a sheet of adhesive composition prepared by the above-mentioned process and held between an aluminium foil and high density polyethylene sheet as in Example 6. The pressed bonded mass had a peel strength of 1.7 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 1.5 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 2.1 kg/2.5 cm width.

CONTROL 20

Pellets were formed, as in Example 6, by an extruder set at 130°C with kneading, excepting that the proportion of dicumyl peroxide used as organic peroxide in Example 6 to prepare an adhesive composition was changed to 15.0 parts by weight. It was attempted to mold the pellets thus formed into an about 100-micron thick sheet by a T-die extruder set at 110°C. However, such sheet could not be obtained due to breakage taking place immediately after molding by the occurrence of a cross-linking reaction.

EXAMPLE 39

Pellets were formed, as in Example 6, by an extruder set at 130°C with kneading, excepting that the 2,6 - di-tert-butyl-4-methylphenol used as a phenolic compound in Example 6 to prepare an adhesive composition was replaced by 1,3,5-trimethyl-2,4,6-tris(3,5-di-tert-butyl-4-hydroxybenzyl) benzene. The pellets thus formed were molded into an about 100-micron thick sheet by a T-die extruder set at 110°C.

Hot pressing was conducted, in the same manner as in Example 6, of a sheet of adhesive composition prepared by the above-mentioned process and placed between an aluminium foil and high density polyethylene sheet as in Example 6. The hot pressed bonded mass had a peel strength of 18.9 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 24.2 kg/2.5 cm width.

Hot pressing was effected, in the same manner as in Example 6, of a sheet of adhesive composition prepared by the above-mentioned process and held between a wooden plate and polyester sheet as in Example 6. The hot pressed bonded mass had a peel strength of 20.1 kg/2.5 cm width.

EXAMPLE 40

Pellets were formed, as in Example 6, by an extruder set at 130°C with kneading, excepting that the 2,6-di-tert-butyl-4-methylphenol used as a phenolic compound in Example 6 to prepare an adhesive composition was replaced by 4,4'-thiobis(3-methyl-6-tert-butylphenol). The pellets thus formed were molded into an about 100-micron thick sheet by a T-die extruder set at 110°C.

Hot pressing was conducted, in the same manner as in Example 6, of a sheet of adhesive composition prepared by the above-mentioned process and placed between an aluminium foil and high density polyethylene sheet as in Example 6. The hot pressed bonded mass had a peel strength of 19.2 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 24.5 kg/2.5 cm width.

Hot pressing was performed, in the same manner as in Example 6, of a sheet of adhesive composition prepared by the above-mentioned process and disposed between a wooden plate and polyester sheet as in Example 6. The hot pressed bonded mass had a peel strength of 21.8 kg/2.5 cm width.

EXAMPLE 41

Pellets were formed, as in Example 6, by an extruder set at 130°C with kneading, excepting that the 2,6-di-tert-butyl-4-methylphenol used as a phenolic compound in Example 6 to prepare an adhesive composition was replaced by 2,6-di-tert-butyl-methoxyphenol. The pellets thus prepared were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 18.2 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 23.6 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength of 21.9 kg/2.5 cm width.

EXAMPLE 42

Pellets were formed, as in Example 6, by an extruder set at 130°C with kneading, excepting that the 2,6-di-tert-butyl-4-methylphenol used as a phenolic compound in Example 6 to prepare an adhesive composition was replaced by p-cresol. The pellets thus formed were molded into an about 100-micron thick sheet by a T-die extruder set at 110°C.

Hot pressing was effected, in the same manner as in Example 6, of a sheet of adhesive composition prepared by the above-mentioned process and placed between an aluminium foil and high density polyethylene sheet as in Example 6. The hot pressed bonded mass had a peel strength of 17.6 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass had a peel strength of 19.4. kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 18.0 kg/2.5 cm width.

EXAMPLE 43

Pellets were formed, as in Example 6, by an extruder set at 130°C with kneading, excepting that the 2,6-di-tert-butyl-4-methylphenol used as a phenolic compound in Example 6 to prepare an adhesive composition was replaced by tetrakis[methylene-3-(3',5'-di-tert-butyl-4'-hydroxyphenyl) propionate] methane. The pellets thus prepared were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 19.3 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 24.0 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength 20.7 kg/2.5 cm width.

EXAMPLE 44

Pellets were formed, as in Example 6, by an extruder set at 130°C with kneading, excepting that the proportion of 2,6-di-tert-butyl-4-methylphenol used as a phenolic compound in Example 6 to prepare an adhesive composition was changed to 0.5 part by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between the aluminium foil and high density polyethylene sheet as in Example 6. The hot pressed bonded mass had a peel strength of 19.8 kg/2.5 cm width.

Hot pressing was conducted in substantially the same manner as described above, excepting that the high density polyethylene sheet used in forming a bonded mass was replaced by the polyvinyl chloride sheet used in Example 6. The hot pressed bonded mass had a peel strength of 24.3 kg/2.5 cm width.

Hot pressing was performed, in the same manner as in Example 6, of a sheet of adhesive composition prepared by the above-mentioned process and put between a wooden plate and polyester sheet as in Example 6. The hot pressed bonded mass had a peel strength of 21.3 kg/2.5 cm width.

EXAMPLE 45

Pellets were formed, as in Example 6, by an extruder set at 130°C with kneading, excepting that the proportion of 2,6-di-tert-butyl-4-methylphenol used as a phenolic compound in Example 6 to prepare an adhesive composition was changed to 1.0 part by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 19.2 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 23.9 kg/2.5 cm width.

Hot pressing was effected, in the same manner as in Example 6, of a sheet of adhesive composition prepared by the above-mentioned process and placed between a wooden plate and polyester sheet as in Example 6. The hot pressed bonded mass had a peel strength of 21.7 kg/2.5 cm width.

EXAMPLE 46

Pellets were formed, as in Example 6, by an extruder set at 130°C with kneading, excepting that the proportion of 2,6-di-tert-butyl-4-methylphenol used as a phenolic compound in Example 6 to prepare an adhesive composition was changed to 2.0 parts by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and disposed between an aluminium foil and high density polyethylene sheet as in Example 6. The hot pressed bonded mass had a peel strength of 19.8 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 24.5 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 21.0 kg/2.5 cm width.

EXAMPLE 47

Pellets were formed, as in Example 6, by an extruder set at 130°C with kneading, excepting that the 2,6-di-tert-butyl-4-methylphenol used as a phenolic compound in Example 6 to prepare an adhesive composition was omitted. The pellets thus formed were molded into an about 100-micron thick sheet by a hot press set at a temperature of 120°C and a pressure of 100 kg/cm$^2$ with a sheet of Teflon (fluorine resin) used as a releasing agent.

Hot pressing was conducted, in the same manner as in Example 6, of a sheet of adhesive composition prepared by the above-mentioned process and disposed between an aluminium foil and high density polyethylene sheet as in Example 6. The hot pressed bonded mass had a peel strength of 17.7 kg/2.5 cm width.

Hot pressing was carried out in substantially the same manner as described above, excepting that the high density polyethylene sheet used in forming a bonded mass was replaced by the polyvinyl chloride sheet used in Example 6. The hot pressed bonded mass and a peel strength of 16.5 kg/2.5 cm width.

Hot pressing was performed, in the same manner as in Example 6, of a sheet of adhesive composition prepared by the above-mentioned process and placed between a wooden plate and polyester sheet as in Example 6. The hot pressed bonded mass had a peel strength of 17.2 kg/2.5 cm width.

CONTROL 21

Pellets were formed, as in Example 6, by an extruder set at 130°C with kneading, excepting that the proportion of 2,6-di-tert-butyl-4-methylphenol used as a phenolic compound in Exmaple 6 to prepare an adhesive composition was changed to 10.0 parts by weight. The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 1.2 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 1.0 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 0.7 kg/2.5 cm width.

EXAMPLE 48

Pellets were formed, as in Example 6, by an extruder set at 130°C with kneading, excepting that the dibutyl-tin dilaurate used as an acid-acceptor in Example 6 to prepare an adhesive composition was replaced by 0.1 part by weight of calcium stearate and also 0.1 part by weight of barium stearate (the proportions of both acid-acceptors respectively account for 2.0% by weight based on the chlorinated polyethylene). The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strength of 18.7 kg/2.5 cm width.

Hot pressing was performed in substantially the same manner as described above, excepting that the high density polyethylene sheet used in forming a bonded mass was replaced by the polyvinyl chloride sheet used in Example 6. The hot pressed bonded mass had a peel strength of 23.5 kg/2.5 cm width.

Hot pressing was conducted, in the same manner as in Example 6, of a sheet of adhesive composition prepared by the above-mentioned process and disposed between a wooden plate and polyester sheet as in Example 6. The hot pressed bonded mass had a peel strength of 20.7 kg/2.5 cm width.

EXAMPLE 49

Pellets were formed, as in Example 6, by an extruder set at 130°C with kneading, excepting that dibutyl-tin dilaurate used as an acid-acceptor in Example 6 to prepare an adhesive composition was replaced by 0.1 part by weight of dibutyl-tin maleate (2.0% by weight based on the chlorinated polyethylene). The pellets thus formed were molded into an about 100-micron thick sheet by a T-die extruder set at 110°C.

Hot pressing was performed, in the same manner as in Example 6, of a sheet of adhesive composition prepared by the above-mentioned process and held between an aluminium foil and high density polyethylene sheet as in Example 6. The hot pressed bonded mass had a peel strength of 19.7 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 21.5 kg/2.5 cm width.

Hot pressing was carried out, in the same manner as in Example 6, of a sheet of adhesive composition prepared by the above-mentioned process and held between a wooden plate and polyester sheet as in Example 6. The hot pressed bonded mass had a peel strength of 21.2 kg/2.5 cm width.

EXAMPLE 50

Pellets were formed, as in Example 49, by an extruder set at 130°C with kneading, excepting that the proportion of dibutyl-tin maleate used as an acid-acceptor in Example 49 to prepare an adhesive composition was changed to 0.05 part by weight (1.0% by weight based on the chlorinated polyethylene). The pellets thus formed were molded into an about 100-micron thick sheet by a T-die extruder set at 110°C.

Hot pressing was carried out, in the same manner as in Example 6, of a sheet of adhesive composition prepared by the above-mentioned process and held between an aluminium foil and high density polyethylene sheet as in Example 6. The hot pressed bonded mass had a peel strength of 18.6 kg/2.5 cm width.

Hot pressing was performed in substantially the same manner as described above, excepting that the high density polyethylene sheet used in forming a bonded mass was replaced by the polyvinyl chloride sheet used in Example 6.

The hot pressed bonded mass had a peel strength of 20.2 kg/2.5 cm width.

Hot pressing was conducted, in the same manner as in Example 6, of a sheet of adhesive composition prepared by the above-mentioned process and placed between a wooden plate and polyester sheet as in Example 6. The hot pressed bonded mass had a peel strength of 20.0 kg/2.5 cm width.

EXAMPLE 51

Pellets were formed, as in Example 49, by an extruder set at 130°C with kneading, excepting that the proportion of dibutyl-tin maleate used as an acid-acceptor in Example 49 to prepare an adhesive composition was changed to 0.4 part by weight (8.0% by weight based on the chlorinated polyethylene). The pellets thus formed were molded into an about 100-micron thick sheet by a T-die extruder set at 110°C.

Hot pressing was carried out, in the same manner as in Example 6, of a sheet of adhesive composition prepared by the above-mentioned process and disposed between an aluminium foil and high density polyethylene sheet as in Example 6. The hot pressed bonded mass had a peel strength of 14.5 kg/2.5 cm width.

Hot pressing was effected in substantially the same manner as described above, excepting that the high density polyethylene sheet used in forming a bonded mass was replaced by the polyvinyl chloride sheet used in Example 6. The hot pressed bonded mass had a peel strength of 13.7 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength of 13.8 kg/2.5 cm width.

EXAMPLE 52

Pellets were formed, as in Example 49, by an extruder set at 130°C with kneading, excepting that the dibutyl-tin maleate used as an acid-acceptor in Example 49 to prepare an adhesive composition was omitted. The pellets thus formed were molded into an about 100-micron thick sheet by a T-die extruder set at 110°C.

Hot pressing was carried out, in the same manner as in Example 6, of a sheet of adhesive composition prepared by the above-mentioned process and placed between an aluminium foil and high density polyethylene sheet as in Example 6. The hot pressed bonded mass had a peel strenght of 18.2 kg/2.5 cm width.

Hot pressing was effected in substantially the same manner as described above, excepting that the high density polyethylene sheet used in forming a bonded mass was replaced by the polyvinyl chloride used in Example 6. The hot pressed bonded mass had a peel strength of 19.7 kg/2.5 cm width.

Hot pressing was conducted, in the same manner as in Example 6, of a sheet of adhesive composition prepared by the above-mentioned process and held between a wooden plate and polyester sheet as in Example 6. The hot pressed bonded mass had a peel strength of 20.1 kg/2.5 cm width.

EXAMPLE 53

Pellets were formed, as in Example 6, by an extruder set at 130°C with kneading, excepting that the ethylenevinyl acetate copolymer used in Example 6 to prepare an adhesive composition was replaced by a mixture consisting of 80 parts by weight of another form of ethylene-vinyl acetate copolymer containing 26% by weight of vinyl acetate (manufactured by Toyo Soda Mfg. Co. under a trade name "Ultrathene UE-634") and 20 parts by weight of low density polyethylene having a density of 0.923 g/cc and melt index of 3.5 g/10 min. as measured at 190°C and under a load of 2.16 kg. The pellets thus formed were molded into an about 100-micron thick sheet by a T-die extruder set at 110°C.

Hot pressing was carried out, in the same manner as in Example 6, of a sheet of adhesive composition prepared by the above-mentioned process and held between an aluminum foil and high density polyethylene sheet as in Example 6. The hot pressed bonded mass had a peel strength of 19.2 kg/2.5 cm width.

Hot pressing was conducted in substantially the same manner as described above, excepting that the high density polyethylene sheet used in forming a bonded mass was replaced by the polyvinyl chloride sheet used in Example 6. The hot pressed bonded mass had a peel strength of 18.6 kg/2.5 cm width.

Hot pressing was performed, in the same manner as in Example 6, of a sheet of adhesive compositon prepared by the above-mentioned process and placed between a wooden plate and polyester sheet as in Example 6. The hot pressed bonded mass had a peel strength of 18.7 kg/2.5 cm width.

EXAMPLE 54

Pellets were formed, as in Example 7, by an extruder set at 130°C with kneading, excepting that the chlorinated polyethylene used in Example 7 to prepare an adhesive composition was replaced by chlorosulfonated polyethylene containing 1.0% by weight of sulphur and 35.0% by weight of chlorine (residual crystallinity of 0.5%) obtained by chlorosulfonating polyethylene of about 120,000 average molecular weight. The pellets thus formed were molded into an about 100-micron thick sheet by a T-die extruder set at 110°C.

Hot pressing was carried out, in the same manner as in Example 7, of a sheet of adhesive composition prepared by the above-mentioned process and placed between an aluminium foil and high density polyethylene sheet as in Example 7. The hot pressed bonded mass had a peel strength of 15.2 kg/2.5 cm width.

Hot pressing was performed in substantially the same manner as described above, excepting that the high density polyethylene sheet used in forming a bonded mass was replaced by the polyvinyl chloride sheet used in Example 7. The hot pressed bonded mass had a peel strength of 12.8 kg/2.5 cm width.

Hot pressing was conducted, in the same manner as in Example 7, of a sheet of adhesive compositon prepared by the above-mentioned process and held between a wooden plate and polyester sheet. The hot pressed bonded mass had a peel strength of 14.2 kg/2.5 cm width.

EXAMPLE 55

Pellets were formed, as in Example 54, by an extruder set at 130°C with kneading, excepting that the proportions of chlorosulfonated polyethylene, calcium stearate and barium stearate used in Example 54 to prepare an adhesive composition were changed to 10.0, 0.1 and 0.1 parts by weight respectively. The pellets thus formed were molded into an about 100-micron thich sheet by a T-die extruder set at 110°C.

Hot pressing was conducted, in the same manner as in Example 54, of a sheet of adhesive composition prepared by the above-mentioned process and disposed between an aluminium foil and high density polyethylene sheet as in Example 54. The hot pressed bonded mass had a peel strength of 14.8 kg/2.5 cm width.

Hot pressing was preformed in substantially the same manner as described above, excepting that the high density polyethylene sheet used in forming a bonded mass was replaced by the polyvinyl chloride sheet used in Example 54. The hot pressed bonded mass had a peel strength of 13.6 kg/2.5 cm width.

Hot pressing was carried out, in the same manner as in Example 54, of a sheet of adhesive composition prepared by the above-mentioned process and held between a wooden plate and polyester sheet as in Example 54. The hot pressed bonded mass had a peel strength of 15.3 kg/2.5 cm width.

EXAMPLE 56

Pellets were formed, as in Example 54, by an extruder set at 130°C with kneading, excepting that the proportions of chlorosulfonated polyethylene, calcium stearate and barium stearate used in Example 54 to prepare an adhesive composition were changed to 20.0, 0.2 and 0.2 parts by weight respectively. The pellets thus formed were molded into an about 100-micron thick sheet by a T-die extruder set at 110°C.

Hot pressing was effected, in the same manner as in Example 54, of a sheet of adhesive composition prepared by the above-mentioned process and placed between an aluminium foil and high density polyethylene sheet as in Example 54. The hot pressed bonded mass had a peel strength of 12.6 kg/2.5 cm width.

Hot pressing was carried out in substantially the same manner as described above, excepting that the high density polyethylene sheet used in forming a bonded mass was replaced by the polyvinyl chloride sheet used in Example 54. The hot pressed bonded mass had a peel strength of 14.2 kg/2.5 cm width.

Hot pressing was preformed, in the same manner as in Example 54, of a sheet of adhesive composition prepared by the above-mentioned process and put between a wooden plate and polyester sheet as in Example 54. The hot pressed bonded mass had a peel strength of 16.2 kg/2.5 cm width.

EXAMPLE 57

Pellets were formed, as in Example 7, by an extruder set at 130°C with kneading, excepting that the 4,4'-thiobis (3-methyl-6-tert-butylphenol) used as a phenolic compound in Example 7 to prepare an adhesive composition was replaced by tetrakis [methylene-3-(3',5'-di-tert-butyl-4'-hydroxyphenyl) propionate] methane. The pellets thus formed were molded into an about 100-micron thick sheet by a T-die extruder set at 110°C.

Hot pressing was carried out, in the same manner as in Example 7, of a sheet of adhesive composition prepared by the above-mentioned process and placed between an aluminium foil and high density polyethylene sheet as in Example 7. The hot pressed bonded mass had a peel strength of 18.5 kg/2.5 cm width.

Hot pressing was performed in substantially the same manner as described above, excepting that the high density polyethylene sheet used in forming a bonded mass was replaced by the polyvinyl chloride sheet used in Example 7. The hot pressed bonded mass had a peel strength of 20.6 kg/2.5 cm width.

Hot pressing was conducted, in the same manner as in Example 7, of a sheet of adhesive composition prepared by the above-mentioned process and placed between a wooden plate and polyester sheet as in Example 7. The hot pressed bonded mass had a peel strength of 20.3 kg/2.5 cm width.

EXAMPLE 58

Pellets were formed, as in Exmaple 7, by an extruder set at 130°C with kneading, excepting that the 4,4'-thiobis (3-methyl-6-tert-butylphenol) used as a phenolic compound in Example 7 to prepare an adhesive composition was replaced by phenol. The pellets thus formed were molded into an about 100-micron thick sheet by a T-die extruder set at 110°C.

Hot pressing was carried out, in the same manner as in Example 7, of a sheet of adhesive composition prepared by the above-mentioned process and placed between an aluminium foil and high density polyethylene sheet as in Example 7. The hot pressed bonded mass had a peel strength of 15.2 kg/2.5 cm width.

Hot pressing was performed in substantially the same manner as described above, excepting that the high density polyethylene sheet used in forming a bonded mass was replaced by the polyvinyl chloride sheet used in Example 7. The hot pressed bonded mass had a peel strength of 16.3 kg/2.5 cm width.

Hot pressing was conducted, in the same manner as in Example 7, of a sheet of adhesive composition prepared by the above-mentioned process and disposed between a wooden plate and polyester sheet as in Example 7. The hot pressed bonded mass had a peel strength of 16.1 kg/2.5 cm width.

CONTROL 22

Pellets were formed, as in Example 7, by an extruder set at 130°C with kneading, excepting that the 4,4'-thiobis (3-methyl-6-tert-butylphenol) used as a phenolic compound in Example 7 to prepare an adhesive composition was replaced by 2.0 parts by weight of dilauryl thiodipropionate. The pellets thus formed were molded into an about 100-micron thick sheet by a T-die extruder set at 110°C.

Hot pressing was carried out, in the same manner as in Example 7, of a sheet of adhesive composition prepared by the above-mentioned process and placed between an aluminium foil and high density polyethylene sheet as in Example 7. The hot pressed bonded mass had a peel strength of 4.7 kg/2.5 cm width.

Hot pressing was performed in substantially the same manner as described above, excepting that the high density polyethylene sheet used in forming a bonded mass was replaced by the polyvinyl chloride sheet used in Example 7. The hot pressed bonded mass had a peel strength of 5.1 kg/2.5 cm width.

Hot pressing was effected, in the same manner as in Example 7, of a sheet of adhesive composition prepared by the above-mentioned process and placed between a wooden plate and polyester sheet as in Example 7. The hot pressed bonded mass had a peel strength of 4.3 kg/2.5 cm width.

EXAMPLE 59

A sheet of adhesive composition containing ethylenevinyl acetate copolymer prepared by the process of Example 1 was placed between the same type of high density polyethylene sheet used in Example 1 to form a bonded mass and a 0.5 mm thick copper plate having its bonding surface previously degreased by trichloroethylene. Hot pressing was carried out in the same manner as in Example 1. The hot pressed bonded mass had a peel strength of 16.1 kg/2.5 cm width.

Hot pressing was effected in substantially the same manner as described above, excepting that the high density polyethylene sheet used in forming a bonded mass by the above-mentioned process was replaced by the polyvinyl chloride sheet used in Example 1. The hot pressed bonded mass had a peel strength of 16.2 kg/2.5 cm width.

Hot pressing was conducted, in the same manner as in Example 1, of a sheet of an adhesive composition prepared by the process of Example 1 and held between the polyester sheet used in Example 1 to form a bonded mass and the above-mentioned copper plate. The hot pressed bonded mass had a peel strength of 16.9 kg/2.5 cm width.

EXAMPLE 60

A sheet of adhesive composition containing ethylenevinyl acetate copolymer prepared by the process of Example 1 was placed between the same type of high density polyethylene sheet used in Example 1 to form a bonded mass and 0.5 mm thick galvanized iron plate. Hot pressing was effected in the same manner as in Example 1. The hot pressed bonded mass had a peel strenght of 17.3 kg/2.5 cm width.

Hot pressing was carried out in substantially the same manner as described above, excepting that the high density polyethylene sheet used in forming the above-mentioned bonded mass was replaced by the polyvinyl chloride sheet used in Example 1. The hot pressed bonded mass had a peel strength of 19.1 kg/2.5 cm width.

A sheet of adhesive composition prepared by the process of Example 1 was held between the polyester sheet used in Example 1 to form a bonded mass and the above-mentioned galvanized iron plate. Hot pressing was performed in the same manner as in Example 1. The hot pressed bonded mass had a peel strength of 19.6 kg/2.5 cm width.

EXAMPLE 61

A sheet of adhesive composition containing ethylene-vinyl acetate copolymer prepared by the process of Example 1 was held between the high density polyethylene sheet used in Example 1 to form a bonded mass and a 1 mm thick glass plate. Hot pressing was performed in the same manner as in Example 1.

Hot pressing was carried out in substantially the same manner as described above, excepting that the high density polyethylene sheet used in forming the above-mentioned bonded mass was replaced by the polyvinyl chloride sheet used in Example 1.

A sheet of adhesive composition prepared by the process of Example 1 was disposed between the polyester sheet used in Example 1 to form a bonded mass and the above-mentioned copper plate. Hot pressing was carried out in the same manner as in Example 1.

The bonded masses obtained in the above-mentioned three cases were so firmly bonded together that it was impossible to separate the bonded members by hand.

CONTROL 23

Pellets were formed, as in Example 1, by an extruder set at 140°C with kneading, excepting that the ethylene-vinyl acetate copolymer used in Example 1 to prepare an adhesive composition was omitted. The pellets thus formed were molded into an about 100-micron thick sheet by a T-die extruder set at 140°C.

Hot pressing was carried out, in the same manner as in Example 1, of a sheet of adhesive composition prepared by the above-mentioned process and placed between an aluminum foil and high density polyethylene sheet as in Example 1. The hot pressed bonded mass had a peel strength of 1.0 kg/2.5 cm width.

Hot pressing was performed in substantially the same manner as described above, excepting that the high density polyethylene sheet used in forming a bonded mass by the above-mentioned process was replaced by the polyvinyl chloride sheet used in Example 1. The hot pressed bonded mass had a peel strength of 2.5 kg/2.5 cm width.

Hot pressing was conducted, in the same manner as in Example 1, of a sheet of adhesive composition prepared by the above-mentioned process and placed between a wooden plate and polyester sheet as in Example 1. The hot pressed bonded mass had a peel strength of 3.3 kg/2.5 cm width.

What we claim is:

1. Resin compositions of high adhesivity comprising (A) 100 parts by weight of ethylene-vinyl acetate copolymer containing 1 to 40% by weight of vinyl acetate or said copolymer mixed with polyethylene; (B) 1 to 100 parts by weight of chlorinated or chlorosulfonated polyethylene; (C) 0.05 to 100 parts by weight of unsaturated carboxylic acids that are solid at room temperature; and (D) 0.005 to 10.0 parts by weight of organic peroxides.

2. Resin compositions according to claim 1, wherein 5.0 parts by weight at most of phenolic compounds are further added to said resin compositions based on 100 parts by weight of the ethylene-vinyl acetate copolymer or said copolymer mixed with polyethylene.

3. Resin compositions according to claim 1, wherein 10.0 parts by weight at most of acid-acceptors are further added to said resin compositions based on 100 parts by weight of the chlorinated or chlorosulfonated polyethylene.

4. Resin compositions according to claim 2, wherein 10.0 parts by weight at most of acid-acceptors are further added to said resin compositions based on 100 parts by weight of the chlorinated or chlorosulfonated polyethylene.

5. Resin compositions according to claim 1, wherein the resin compositions include chlorinated polyethylene having a chlorination degree of 20 to 50% by weight or chlorosulfonated polyethylene having a chlorination degree of 20 to 45% by weight and a sulfonation degree of less than 5% by weight.

6. Resin compositions according to claim 2, wherein the resin compositions include chlorinated polyethylene having a chlorination degree of 20 to 50% by weight or chlorosulfonated polyethylene having a chlorination degree of 20 to 45% by weight and a sulfonation degree of less than 5% by weight.

7. Resin compositions according to claim 3, wherein the resin compositions include chlorinated polyethylene having a chlorination degree of 20 to 50% by weight or chlorosulfonated polyethylene having a chlorination degree of 20 to 45% by weight and a sulfonation degree of less than 5% by weight.

8. Resin compositions according to claim 4, wherein the resin compositions include chlorinated polyethylene having a chlorination degree of 20 to 50% by weight or chlorosulfonated polyethylene having a chlorination degree of 20 to 45% by weight and a sulfonation degree of less than 5% by weight.

9. Resin compositions according to claim 1, wherein the unsaturated carboxylic acids are selected from the group consisting of aliphatic and aromatic unsaturated carboxylic acids.

10. Resin compositions according to claim 2, wherein the unsaturated carboxylic acids are selected from the group consisting of aliphatic and aromatic unsaturated carboxylic acids.

11. Resin compositions according to claim 3, wherein the unsaturated carboxylic acids are selected from the group consisting of aliphatic and aromatic unsaturated carboxylic acids.

12. Resin compositions according to claim 4, wherein the unsaturated carboxylic acids are selected from the group consisting of aliphatic and aromatic unsaturated carboxylic acids.

13. Resin compositions according to claim 9, wherein the aliphatic unsaturated carboxylic acids are selected from the group consisting of crotonic acid, maleic acid, fumaric acid, itaconic acid, 2-methylene glutaric acid and citraconic acid.

14. Resin compositions according to claim 10, wherein the aliphatic unsaturated carboxylic acids are selected from the group consisting of crotonic acid, maleic acid, fumaric acid, itaconic acid, 2-methylene glutaric acid and citraconic acid.

15. Resin compositions according to claim 11, wherein the aliphatic unsaturated carboxylic acids are selected from the group consisting of crotonic acid, maleic acid, fumaric acid, itaconic acid, 2-methylene glutaric acid and citraconic acid.

16. Resin compositions according to claim 12, wherein the aliphatic unsaturated carboxylic acids are selected from the group consisting of crotonic acid, maleic acid, fumaric acid, itaconic acid, 2-methylene glutaric acid and citraconic acid.

17. Resin compositions according to claim 9, wherein the aromatic unsaturated carboxylic acid is cinnamic acid.

18. Resin compositions according to claim 10, wherein the aromatic unsaturated carboxylic acid is cinnamic acid.

19. Resin compositions according to claim 11, wherein the aromatic unsaturated carboxylic acid is cinnamic acid.

20. Resin compositions according to claim 12, wherein the aromatic unsaturated carboxylic acid is cinnamic acid.

21. Resin compositions according to claim 1, wherein the organic peroxides are selected from the group consisting of ketone peroxides, hydroperoxides, kialkyl peroxides, diacyl peroxides and peroxy esters.

22. Resin compositions according to claim 2, wherein the organic peroxides are selected from the group consisting of ketone peroxides, hydroperoxides, dialkyl peroxides, diacyl peroxides and peroxy esters.

23. Resin compositions according to claim 3, wherein the organic peroxides are selected from the group consisting of ketone peroxides, hydroperoxides, dialkyl peroxides, diacyl peroxides and peroxy esters.

24. Resin compositions according to claim 4, wherein the organic peroxides are selected from the group consisting of ketone peroxides, hydroperoxides, dialkyl peroxides, diacyl peroxides and peroxy esters.

25. Resin compositions according to claim 2, wherein the phenolic compounds are selected from the group consisting of monophenolic compounds, bisphenolic compounds, triphenolic compounds and tetraphenolic compounds.

26. Resin compositions according to claim 4, wherein the phenolic compounds are selected from the group consisting of monophenolic compounds, bisphenolic compounds, triphenolic compounds and tetraphenolic compounds.

27. Resin compositions according to claim 3, wherein the acid-acceptors are selected from the group consisting of metal soaps, salts of inorganic acids, organic tin compounds, chelating agents, organic compounds containing an epoxy radical, and mixtures of stabilizing agents for polyvinyl chloride resins.

28. Resin compositions according to claim 4, wherein the acid-acceptors are selected from the group consisting of metal soaps, salts of inorganic acids, organic tin compounds, chelating agent, organic compounds containing an epoxy radical, and mixtures of stabilizing agents for polyvinyl chloride resins.

* * * * *